US012220927B2

(12) United States Patent
Hoshi et al.

(10) Patent No.: US 12,220,927 B2
(45) Date of Patent: Feb. 11, 2025

(54) THERMAL HEAD

(71) Applicant: SATO HOLDINGS KABUSHIKI KAISHA, Tokyo (JP)

(72) Inventors: Kazuyuki Hoshi, Tokyo (JP); Hiroshi Kokuta, Tokyo (JP); Tatsuyuki Takahashi, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 18/252,847

(22) PCT Filed: Nov. 10, 2021

(86) PCT No.: PCT/JP2021/041378
§ 371 (c)(1),
(2) Date: May 12, 2023

(87) PCT Pub. No.: WO2022/107666
PCT Pub. Date: May 27, 2022

(65) Prior Publication Data

US 2024/0001688 A1 Jan. 4, 2024

(30) Foreign Application Priority Data

Nov. 18, 2020 (JP) ................................ 2020-191682

(51) Int. Cl.
*B41J 2/335* (2006.01)

(52) U.S. Cl.
CPC ......... *B41J 2/33505* (2013.01); *B41J 2/3358* (2013.01)

(58) Field of Classification Search
CPC ........ B41J 2/33505; B41J 2/3358; B41J 2/32; B41J 2/335
See application file for complete search history.

(56) References Cited

U.S. PATENT DOCUMENTS

| | | | | |
|---|---|---|---|---|
| 5,739,836 | A | 4/1998 | Nishi | |
| 6,339,444 | B1 | 1/2002 | Sugiyama | |
| 2002/0041320 | A1 | 4/2002 | Takizawa | |
| 2006/0088360 | A1 | 4/2006 | Watanabe et al. | |
| 2013/0335500 | A1* | 12/2013 | Sanbongi | B41J 2/3357 29/611 |
| 2016/0318309 | A1* | 11/2016 | Moto | B41J 2/3357 |
| 2023/0126990 | A1* | 4/2023 | Kato | B41J 2/3351 347/208 |

FOREIGN PATENT DOCUMENTS

| | | | |
|---|---|---|---|
| JP | 9254423 | A | 9/1997 |
| JP | H09-254423 | A | 9/1997 |
| JP | 2002-036615 | A | 2/2002 |
| JP | 2006-123271 | A | 5/2006 |
| JP | 2012-206267 | A | 10/2012 |

* cited by examiner

*Primary Examiner* — Kristal Feggins
(74) *Attorney, Agent, or Firm* — Foley & Lardner LLP

(57) ABSTRACT

An embodiment of the present invention is a thermal head including: a heat dissipation plate having a first surface of a substantially rectangular shape in a plane view, and a second surface that is on an opposite side to the first surface; a board attached to the heat dissipation plat in such a manner as to extend from the first surface to the second surface, via a first end part interposed between the first surface and the second surface; a heating part having a plurality of heating elements, the heating part being disposed on the board over the first surface; and surface-mount devices mounted on the board over the second surface.

17 Claims, 25 Drawing Sheets

COVER OPEN BUTTON IS OPERATED

PRINTER COVER IS CLOSED

COVER OPEN BUTTON IS OPERATED

S1 (CONTINUOUS ISSUING IS PERFORMED)

S2 (PEELING UNIT OPEN BUTTON IS CONTINUOUSLY OPERATED)

ENLARGED A-A CROSS SECTION

S8

S9

A-A CROSS SECTION

B-B CROSS SECTION

THERMAL HEAD

FIELD

The present invention relates to a thermal head used for printing in a thermal printer, and also relates to a printer having a thermal head therein.

BACKGROUND

A thermal printer is known which rotationally drives a platen roller to feed a print medium such as a label continuous body, a tag continuous body, or the like, while a thermal head pinches the print medium with the platen roller, and prints on the print medium. As printing methods for a thermal printer, there are known a thermal transfer printing method and a thermal color developing method. In the thermal transfer printing method, a thermal transfer ink ribbon is used together with a print medium. In the thermal color developing method, a thermal paper having a thermal color developing layer (a thermal layer) is used as a print medium.

Conventionally, a variety of thermal heads and printers have been suggested (see Japanese Unexamined Patent Application Publication No. 2012-206267, for example).

BRIEF SUMMARY

Technical Problem

Incidentally, thermal printers are often carried and used in retail business such as a supermarket, and thus, water protection should be employed in thermal printers. Particularly, because a thermal head is normally disposed near an ejection part that ejects a print medium such as a printed label, the thermal head is likely to be exposed to water that may enter from the ejection part. For example, a driver IC of the thermal head is exposed to a paper outlet for a heat-sensitive paper, in the printer disclosed in Japanese Unexamined Patent Application Publication No. 2012-206267, for example, and water that enters the paper outlet may cause the driver IC to be defective. Therefore, a thermal head more excellent than ever before in water protection has been requested.

In view of the above, an object of the present invention is to provide a thermal head more excellent than ever before in water protection.

Solution to Problem

An embodiment of the present invention is a thermal head including: a heat dissipation plate having a first surface of a substantially rectangular shape in a plane view, and a second surface that is on an opposite side to the first surface; a board attached to the heat dissipation plat in such a manner as to extend from the first surface to the second surface, via a first end part interposed between the first surface and the second surface; a heating part having a plurality of heating elements, the heating part being disposed on the board over the first surface; and surface-mount devices mounted on the board over the second surface.

Advantageous Effects

According to the embodiment of the present invention, it is possible to provide a thermal head more excellent than ever before in water protection.

BRIEF DESCRIPTION OF DRAWINGS

FIG. 21A shows a cross section in a plane perpendicular to an upper-lower direction, and FIG. 21B shows a cross section in a plane perpendicular to a right-left direction.

DETAILED DESCRIPTION

Schematic Structure of Printer 1

A printer 1 according to one embodiment of the present invention is a label printer in which continuous issuing and peeling issuing can be switched. Hereinafter, the printer 1 will be described in detail with reference to the attached drawings.

Figure 1A:
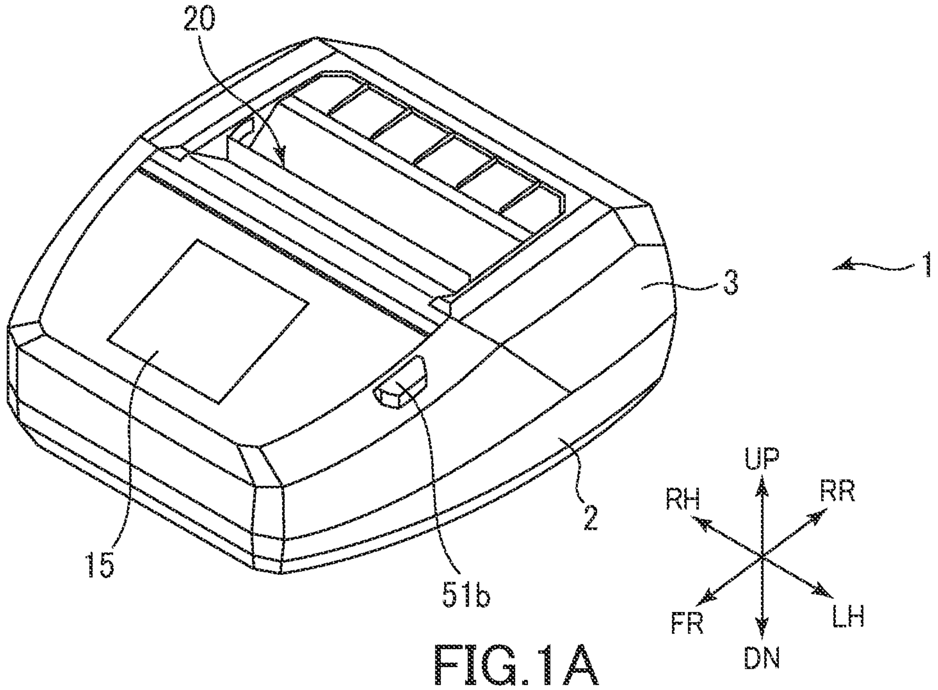
FIG. 1A is a perspective view of a printer according to an embodiment, in which a printer cover is in a closed state.

It is noted that directions of up (UP), down (DN), left (LH), right (RH), front (FR), and rear (RR) are defined in each drawing, for example, as illustrated in the perspective views of FIGS. 1A and 1, but these definitions of directions are made mainly for convenience of explanation of drawings and are not intended to limit an in-use position of the printer of the present invention.

In these definitions of directions, a "printer front-rear direction" means a front-rear direction of the printer 1. A "printer width direction" means a right-left direction or a lateral direction of the printer 1.

Figure 1B:
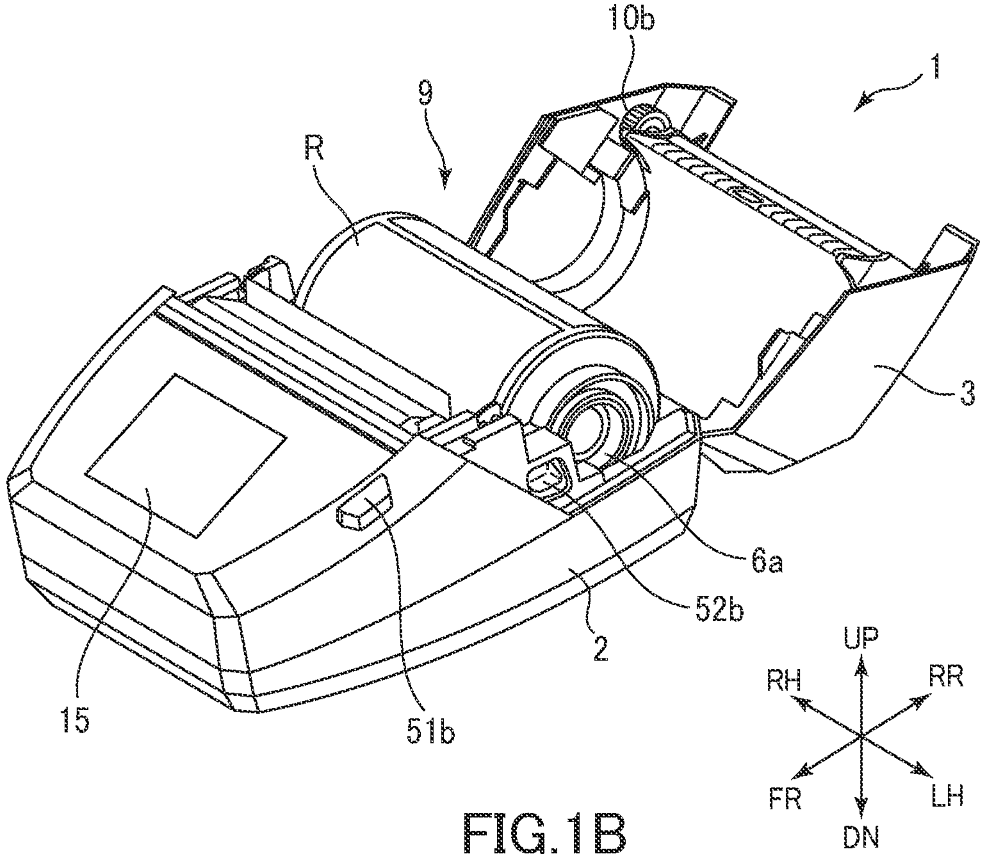
FIG. 1B is a perspective view of the printer of the embodiment, in which the printer cover is in an open state.
Figure 2:
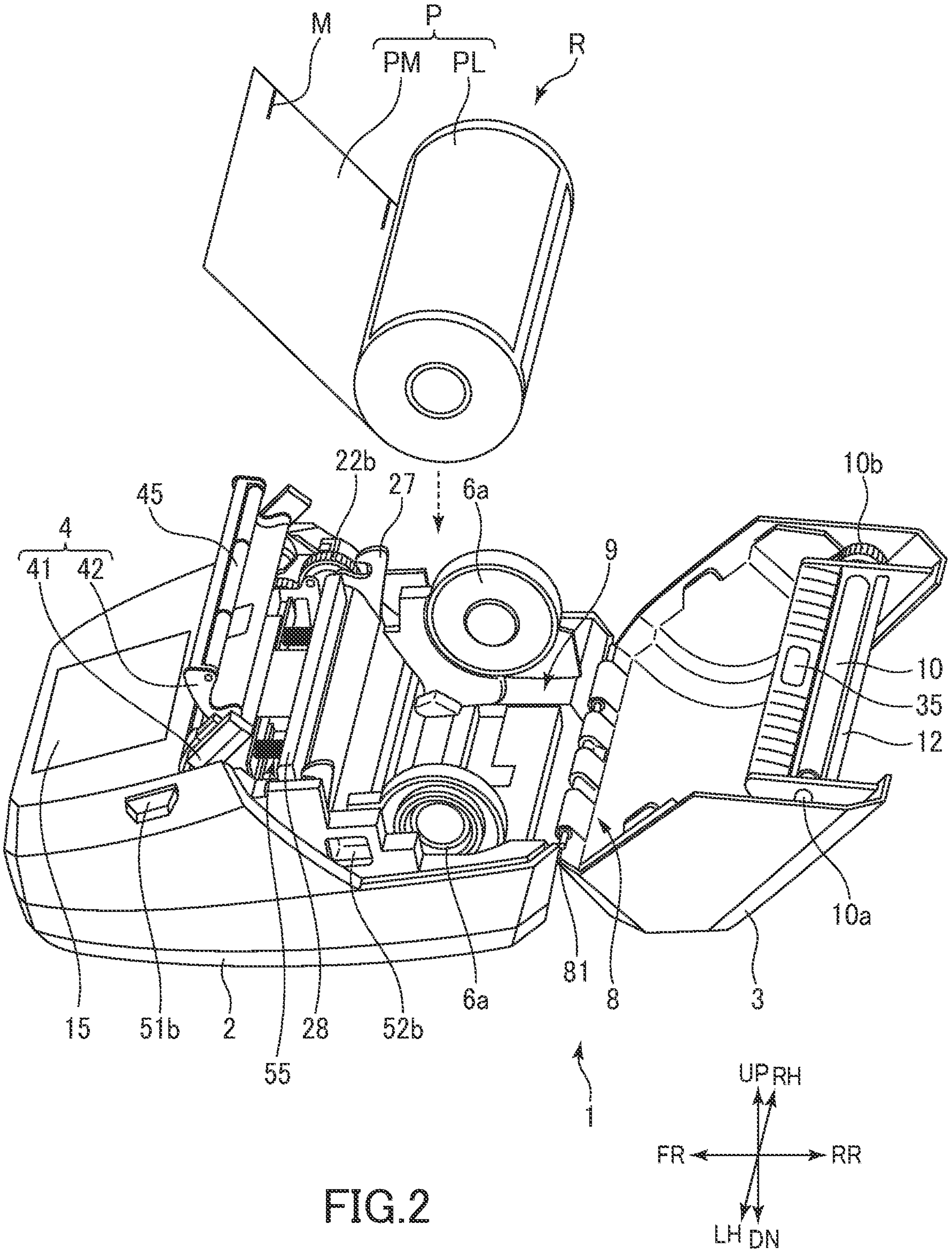
FIG. 2 is a perspective view of the printer of the embodiment, in which the printer cover is in the open state, a peeling unit is in an open state, and a paper roll is not contained.

Each of FIGS. 1A, 1B, and 2 is a perspective view of the printer 1 of this embodiment. FIG. 1A shows a case in which a printer cover 3 is in a closed state. FIGS. 1B and 2 show cases in which the printer cover 3 is in an open state. FIG. 1B shows a state in which a paper roll "R" is set. FIG. 2 illustrates a paper roll "R" and shows a state of the printer 1 before the paper roll "R" is set.

As shown in FIG. 1A, the printer 1 has a body case 2 and the printer cover 3 that protect internal functional components. The printer 1 has an upper surface provided with an ejection part 20 for ejecting labels.

It is possible to use the printer 1 with the ejection part 20 facing upward (in a horizontally placed state); however, the printer 1 can also be used with the ejection part 20 facing a horizontal direction (in a vertically held state), such as by hanging a belt hook (not shown) provided on a bottom of the printer 1, on a belt of an operator, or by attaching a shoulder strap (not shown) to the printer 1 and putting it on a shoulder of an operator.

A display panel 15 is provided on a front side of the ejection part 20 in the body case 2. The display panel 15 may have a touch panel input mechanism for receiving an operation input from an operator. The display panel 15 is connected to a circuit board inside the printer 1 and outputs an image of a user interface related to, for example, an operating state of the printer 1 or operation of the printer 1, based on a display signal supplied from the circuit board.

Although not shown, an internal frame for supporting or holding various functional components is disposed in the inside of the printer 1, which is surrounded by the body case 2 and the printer cover 3. The internal frame, the body case 2, and the printer cover 3 correspond to a printer body.

The printer cover 3 is able to swing between an open position for exposing the inside of the printer 1 and a closed position for covering the inside of the printer 1.

In response to operation to a cover open button 51*b* that is provided to the body case 2, the printer cover 3 opens as shown in FIG. 1B. Opening the printer cover 3 exposes a paper roll-containing chamber 9. The paper roll-containing chamber 9 forms space for containing a paper roll "R".

As shown in FIG. 2, the paper roll "R" has a roll shape into which a strip continuous paper "P" is wound. The continuous paper "P" includes a strip liner PM and a plurality of labels PL that are temporarily attached on the liner PM at predetermined intervals. A label adherend surface of the liner PM is coated with a release agent, such as silicone, in order to easily peel off labels PL. In addition, position detection marks "M" that indicate reference positions of labels PL are formed at predetermined intervals on a back surface of the label adherend surface of the liner PM.

A front side of the label PL is a printing surface to be printed with information, and it is formed with a thermal color developing layer that develops a specific color when reaching a predetermined temperature region. A back side of the printing surface is an adhesive surface coated with an adhesive. The adhesive surface is attached to the label adherend surface of the liner PM, whereby the label PL is temporarily attached on the liner PM.

A pair of paper roll guides 6*a* are placed in the paper roll-containing chamber 9. The pair of paper roll guides 6*a* are members that rotatably support the paper roll "R" while being in contact with both side surfaces of the paper roll "R" and that guide feeding the continuous paper pulled out of the paper roll "R." The paper roll guides 6*a* are preferably movable along a width direction of the paper roll "R" in order to vary their positions in accordance with the width of the paper roll "R."

As shown in FIG. 2, the printer cover 3 is axially supported to the body case 2 by a hinge 8 so as to swing relative to the body case 2 between the open position and the closed position. The hinge 8 has a hinge shaft 81 that is provided with a torsion spring (not shown) for biasing the printer cover 3 in a direction from the closed position to the open position.

As shown in FIG. 2, a platen roller 10 (an example of a feed roller) is axially supported in a manner rotatable in forward and reverse directions, at an end of the printer cover 3. The platen roller 10 is a feeding unit for feeding the continuous paper "P" pulled out of the paper roll "R" and is formed in such a manner as to extend along the width direction of the continuous paper "P." A gear 10*b* is coupled to an end of a platen shaft 10*a* of the platen roller 10. When the printer cover 3 is at the closed position, the gear 10*b* engages with a gear 22*b* that is disposed in the body case 2, and it is mechanically connected via the gear 22*b* to a roller-driving stepping motor (not shown) or the like.

As shown in FIG. 2, a peeling bar 12 is placed along and in the vicinity of the platen roller 10, in the printer cover 3. The peeling bar 12 is a peeling member for peeling labels PL from the liner PM and is fixed to both side walls of the printer cover 3 at both ends. The peeling bar 12 may be fixed to both ends of the platen shaft 10*a*.

In an embodiment, the cross section of the peeling bar 12 has a substantially triangle shape; however, it is not limited thereto, and it may have a spherical shape or an elliptical shape.

The body case 2 is provided with a platen-holding bracket 27 for holding the platen shaft 10*a* of the platen roller 10 when the printer cover 3 is closed. A thermal head 28 is disposed in front of the platen-holding bracket 27.

The thermal head 28 is a print unit for printing information such as characters, symbols, figures, or bar codes, on labels PL, which are temporarily attached on the liner PM fed out of the paper roll "R." The thermal head 28 is provided so as to face the platen roller 10 when the printer cover 3 is in the closed state.

As described later, a flexible cable that is connected to the circuit board (not shown) is detachably attached to the thermal head 28. The thermal head 28 includes a plurality of heating elements (heating resistors) that are arranged along the width direction of the continuous paper "P." The thermal head 28 performs printing by selectively energizing the plurality of heating elements based on a signal transmitted from the circuit board.

As shown in FIG. 2, coil springs 55 are disposed in front of the thermal head 28. The coil spring 55 is in contact with the thermal head 28 at a rear end and is also in contact with the internal frame at a front end (also refer to FIG. 19). The coil spring 55 biases the thermal head 28 to the platen roller 10 in printing, whereby the thermal head 28 is pressed against the platen roller 10 by an optimum pressure for printing.

The printer 1 includes a peeling unit 4 and performs continuous issuing and peeling issuing in accordance with the peeling unit 4 moved between a continuous issuing position and a peeling issuing position. As shown in FIG. 1B, a peeling unit open button 52*b* is exposed when the printer cover 3 is at the open position. The peeling unit 4 is moved by operating the peeling unit open button 52*b*. FIG. 2 shows a state of the peeling unit 4 when the peeling unit open button 52*b* is operated.

As described later, the peeling unit open button 52*b* is operated by an operator, in order to switch from continuous issuing to peeling issuing.

As shown in FIG. 2, the peeling unit 4 includes a peeling roller cover 41 and a peeling roller holder 42 that holds a peeling roller 45. The peeling roller cover 41 covers the peeling roller holder 42 in continuous issuing. The peeling roller cover 41 is axially supported by the internal frame in the body case 2 and swings from a closed position to an open position (state shown in FIG. 2) in accordance with operation to the peeling unit open button 52*b*.

The peeling roller holder 42 is axially supported by the peeling roller cover 41. In continuous issuing, the peeling roller holder 42 is contained in such a manner as to be folded under a back surface of the peeling roller cover 41.

The peeling unit 4 will be detailed later.

The printer cover 3 is provided with a sensor 35. The sensor 35 is disposed in a feeding path of the continuous paper "P", along which the continuous paper "P" pulled out of the paper roll "R" reaches the platen roller 10. The sensor 35 detects positions of labels PL, when the printer cover 3 is in the closed state. It is preferable to control a feeding amount of the continuous paper "P" based on results detected by the sensor 35.

Although not shown, it is preferable to provide a cutter for cutting the liner PM of the continuous paper "P" that has been continuously issued. In the case of providing a cutter, the cutter is placed at the ejection part 20 so as to extend along the width direction of the continuous paper "P." Alternatively, the function of the cutter may be imparted to the peeling bar 12.

Continuous Issuing and Peeling Issuing

Next, continuous issuing and peeling issuing of the printer 1 will be described with reference to FIG. 3.

The printer 1 is configured to allow switching between peeling issuing and continuous issuing. Peeling issuing is issuing labels after peeling them from a liner of a continuous paper, while continuous issuing is issuing labels without peeling them from the liner.

For continuous issuing, a liner that is attached with a necessary amount of labels is prepared, and the labels can be affixed by peeling them from the liner in a working site. Thus, continuous issuing is appropriate for a situation that a target on which a label is to be affixed is distant from the printer 1. In order to perform continuous issuing, the peeling unit 4, which is mounted to the printer 1, is set to the continuous issuing position.

On the other hand, in the case of peeling issuing, labels are ejected one by one in a state of being peeled from a liner. Thus, peeling issuing is appropriate for a situation that a target on which a label is to be affixed is close to an operator. In order to perform peeling issuing, the peeling unit 4, which is mounted to the printer 1, is set to the peeling issuing position. In this state, as a continuous paper is fed by rotating the platen roller 10 in order to perform printing, while a liner is fed in a state of being nipped between the peeling roller 45 and the platen roller 10, printed labels are individually peeled from the liner and are then ejected to the outside of the printer 1.

Figure 3:
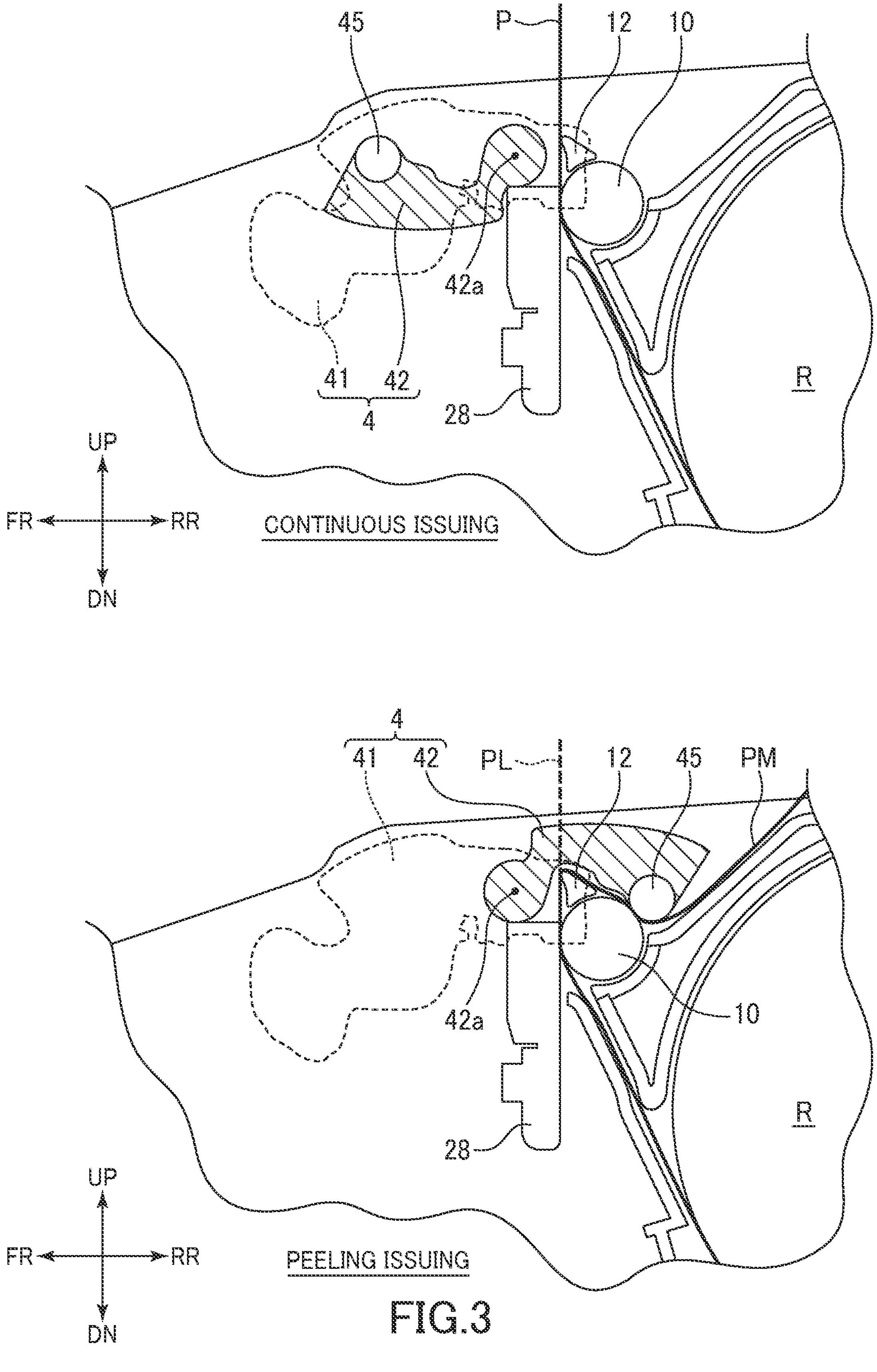
FIG. 3 shows partial sectional views for explaining continuous issuing and peeling issuing in the printer of the embodiment.

FIG. 3 shows schematic partial sectional views showing positional relationships between the peeling unit 4, the platen roller 10, the peeling bar 12, and the thermal head 28 in continuous issuing and in peeling issuing. The peeling roller cover 41 and the peeling roller holder 42 of the peeling unit 4 are represented only by outlines in FIG. 3. The outline of the peeling roller cover 41 is shown by a dotted line.

In addition, the position of the peeling roller holder 42 differs between continuous issuing and peeling issuing, and therefore, only the peeling roller holder 42 is shown by hatching.

The position of the peeling unit 4 in continuous issuing corresponds to the continuous issuing position, whereas the position of the peeling unit 4 in peeling issuing corresponds to the peeling issuing position.

As shown in FIG. 3, in continuous issuing, the peeling roller holder 42 is contained under the peeling roller cover 41, and the peeling roller 45 is thereby at a position spaced apart the platen roller 10 and thus does not interrupt ejection of the continuous paper "P." The continuous paper "P" that has been pulled out of the paper roll "R" is nipped between the platen roller 10 and the thermal head 28, and labels on the continuous paper "P" are printed.

In order to switch from continuous issuing to peeling issuing, the peeling roller holder 42 is swung around a shaft 42*a* to a position shown in FIG. 3. As shown in FIG. 3, in peeling issuing, the peeling roller 45 is disposed at a position facing the platen roller 10. Also, in peeling issuing, the continuous paper "P" that has been pulled out of the paper roll "R" is nipped between the platen roller 10 and the thermal head 28, and labels on the continuous paper "P" are printed. This movement is the same as in continuous issuing. In peeling issuing, the liner PM of the continuous paper "P" that has been pulled out of the paper roll "R" is quickly turned by the peeling bar 12 and is nipped between the platen roller 10 and the peeling roller 45 to be ejected. In accordance with quick turning of the liner PM at the peeling bar 12, a label PL is peeled from the liner PM and ejected.

Opening Movement of Printer Cover 3

Next, opening movement of the printer cover 3 will be described with reference to FIGS. 4 and 5. In addition, a cover open lever 51 and a peeling unit open lever 52 will also be described.

Figure 4:
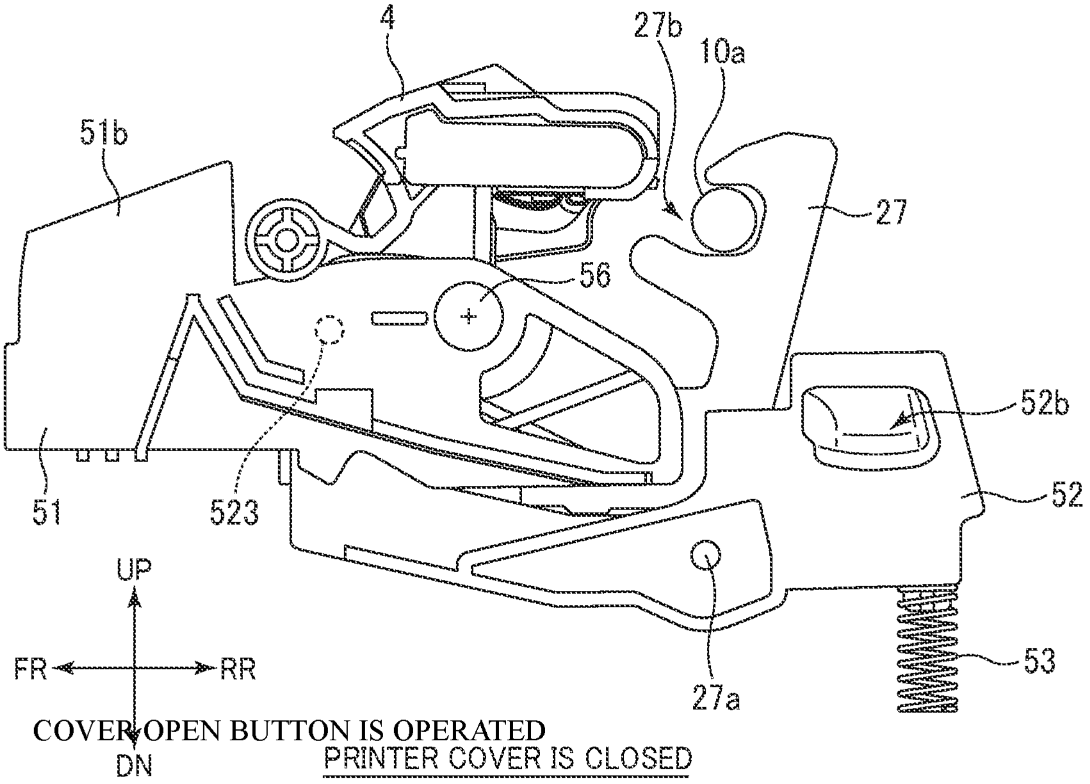
FIG. 4 illustrates a mechanism for making the printer cover be in the open state by using a cover open button.
Figure 4:
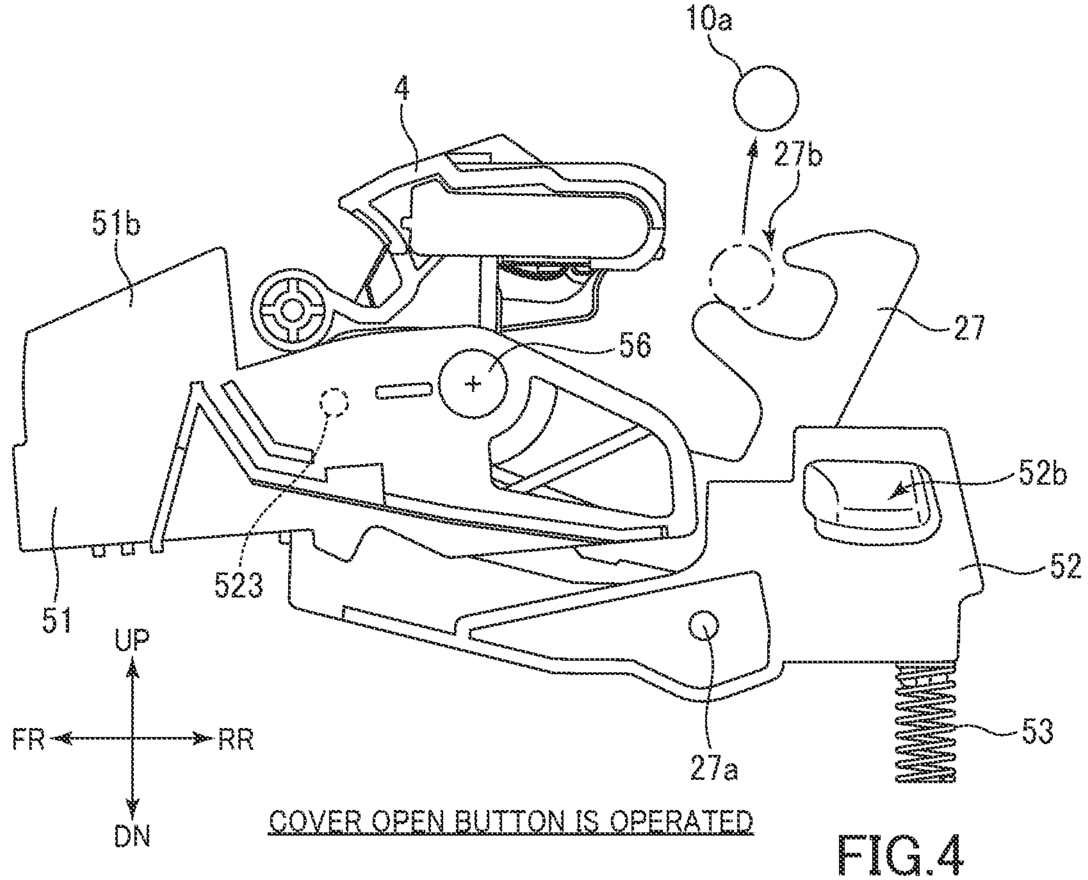

FIG. 4 shows side views of the cover open lever 51, the peeling unit open lever 52, the platen-holding bracket 27, and the peeling unit 4 when the printer cover is closed and when the cover open button is operated. FIG. 4 shows an exemplary situation in which the peeling unit 4 is at the continuous issuing position.

As shown in FIG. 4, in a side view, the cover open lever 51 and the peeling unit open lever 52 are disposed to face in the front-rear direction, while extending in the front-rear direction at mutually different heights, resulting in space-efficient arrangement.

Figure 5:
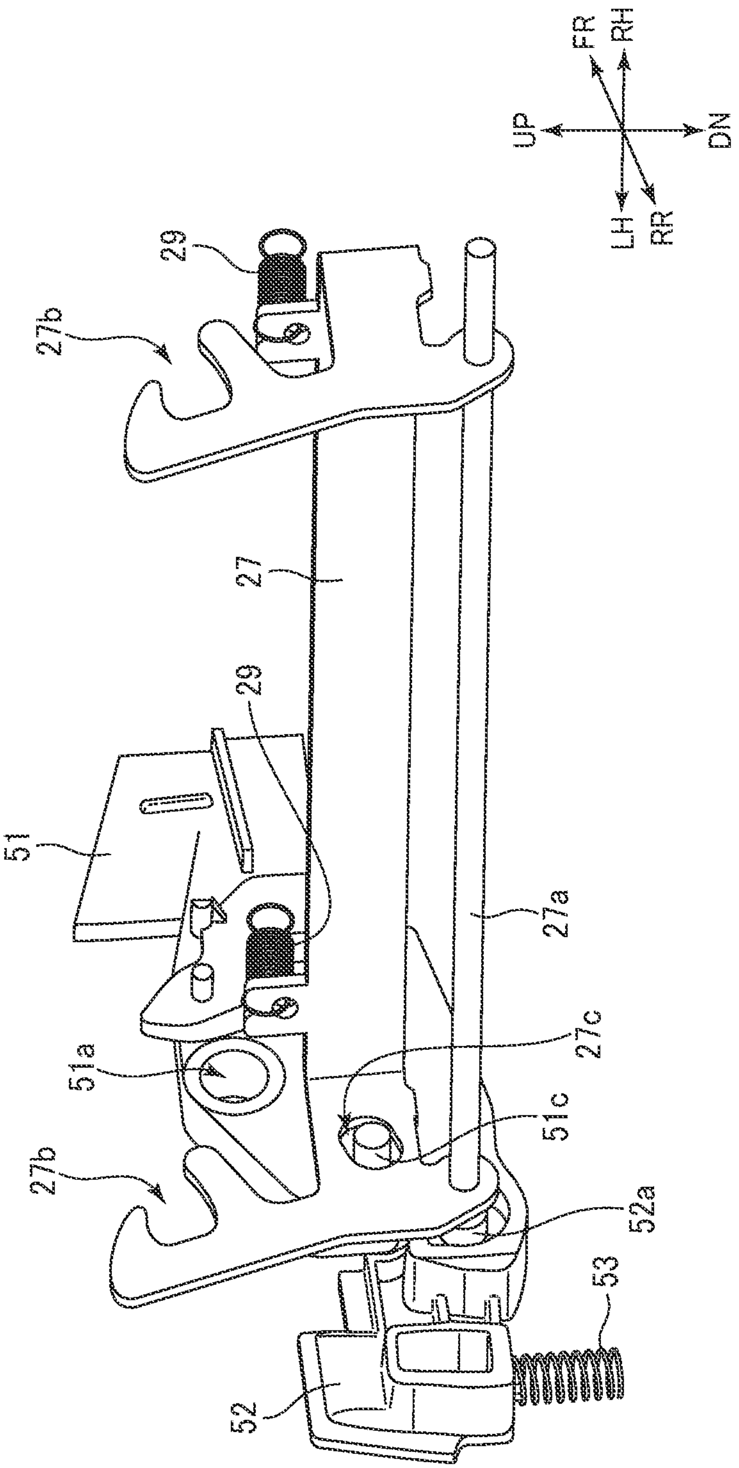
FIG. 5 shows positional relationships between a platen-holding bracket and levers.

FIG. 5 is a perspective rear view of the cover open lever 51, the peeling unit open lever 52, the platen-holding bracket 27, and the peeling unit 4 when the printer cover is closed. FIG. 5 omits illustration of the peeling unit 4.

The cover open lever 51 has the cover open button 51*b* that is exposed to the outside, as shown in FIG. 1A. The cover open lever 51 is formed with a shaft insertion hole 51*a*, and a shaft part 56 (not shown in FIG. 5) that is provided to the internal frame is inserted in the shaft insertion hole 51*a*. This makes the cover open lever 51 be able to swing around the shaft part 56. As shown in FIG. 5, the cover open lever 51 has a protrusion 51*c* that protrudes inward.

As shown in FIG. 5, the platen-holding bracket 27 has a shaft 27*a*. One end of the shaft 27*a* is inserted in a boss 52*a* that is provided to the peeling unit open lever 52, whereas the other end of the shaft 27*a* is inserted in a boss that is provided to the internal frame (not shown). This makes the platen-holding bracket 27 be able to swing around the shaft 27*a*.

In addition, the peeling unit open lever 52 has an engaging protrusion 523 (refer to FIG. 4) that protrudes inward, although the engaging protrusion 523 is not seen in FIG. 5. As described later, the engaging protrusion 523 engages with the peeling roller cover 41 of the peeling unit 4.

The platen-holding bracket 27 has a hole 27*c* that is formed in a side wall, and the protrusion 51*c* of the cover open lever 51 is inserted in the hole 27*c*. Herein, the hole 27*c* is formed greater than the protrusion 51*c* in a side view (that is, the hole 27*c* has play), whereby the platen-holding bracket 27 is able to swing. The platen-holding bracket 27 swings around the shaft 27*a*, whereas the cover open lever 51 swings around the shaft part 56 (refer to FIG. 4), and therefore, they have different swing axes. In consideration of this, the hole 27*c* is provided with play so as to absorb the difference in trajectory between the hole 27*c* and the protrusion 51*c* due to the different swing axes.

The peeling unit open lever 52 is able to turn (or swing) around the shaft 27*a*, which is inserted in the boss 52*a*. That is, the platen-holding bracket 27 and the peeling unit open lever 52 share the single swing shaft 27*a*, which eliminates a need to provide another swing shaft for the peeling unit open lever 52, resulting in contribution to reduction in space and cost. Nevertheless, the structure is not limited thereto, and in another embodiment, an individual swing shaft may be set to each of the platen-holding bracket 27 and the peeling unit open lever 52.

A coil spring 53 is interposed between the peeling unit open lever 52 and the internal frame (not shown), at a position immediately below the peeling unit open button 52*b*. Upon being pressed (operated) down against a restoring force of the coil spring 53, the peeling unit open lever 52 swings around the shaft 27*a* (swings in a clockwise direction in FIG. 4). As described later, in accordance with swinging of the peeling unit open lever 52, the peeling unit 4 swings via the engaging protrusion 523 and moves from the closed position to the open position.

When the force for pressing down the peeling unit open button 52*b* is released, the peeling unit open lever 52 returns (swings) to the position where it is disposed before being pressed down, by the restoring force of the coil spring 53.

The platen-holding bracket 27 is biased by a pair of coil springs 29. In FIG. 5, one end of each of the coil springs 29 is hooked to the platen-holding bracket 27, whereas the other end of each of the coil springs 29 is hooked to the internal frame (not shown).

Unless an external force is applied to the platen-holding bracket 27, the platen-holding bracket 27 is in the position at the time the printer cover is closed, as shown in FIG. 4, and it holds the platen shaft 10*a* in a groove 27*b*. This position is a locking position for locking the printer cover 3 coupled to the platen shaft 10*a*, at the closed position.

In this state, in response to the cover open button 51*b* being pressed (operated) down, the cover open lever 51 swings around the shaft part 56 (swings in a counterclockwise direction in FIG. 4). In accordance with swinging of the cover open lever 51, the protrusion 51*c* presses a rim of the hole 27*c* of the platen-holding bracket 27 to swing the platen-holding bracket 27 around the shaft 27*a* (in the clockwise direction in FIG. 4) against the restoring force of the coil spring 29. As described above, the printer cover 3, which is mounted with the platen shaft 10*a*, is biased in the direction from the closed position to the open position. Thus, the printer cover 3 moves to the open position when the platen shaft 10*a* comes off from the groove 27*b* due to swinging of the platen-holding bracket 27. The position of the platen-holding bracket 27 at this time is an unlocking position for unlocking the printer cover 3 at the closed position.

Conversely, in closing the printer cover 3, a pressing down force of an operator closing the printer cover 3 makes the platen shaft 10*a*, which is mounted to the printer cover 3, press down an inclined top part of the platen-holding bracket 27 against the restoring force of the coil spring 29. In response to this, the platen-holding bracket 27 is swung in the clockwise direction in FIG. 4, and the platen shaft 10*a* is inserted in the groove 27*b* of the platen-holding bracket 27. In the state in which the platen shaft 10*a* is inserted in the groove 27*b*, the platen-holding bracket 27 returns to the locking position at the time the printer cover is closed, as shown in FIG. 4, by the restoring force of the coil spring 29.

Peeling Unit 4

Next, the peeling unit 4 will be described with reference to FIGS. 6 to 9.

Figure 6:
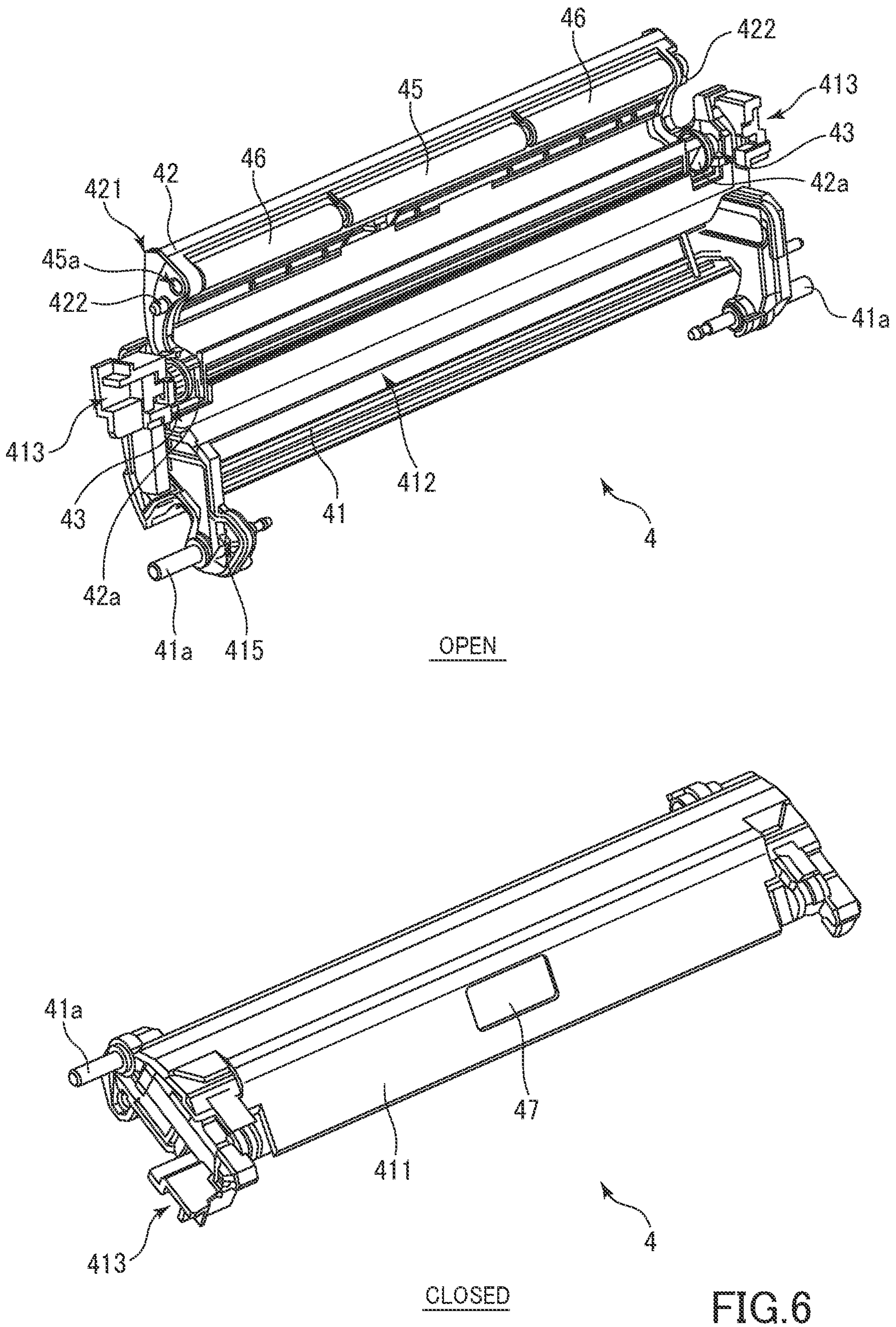
FIG. 6 shows perspective views of the peeling unit when open and when closed.

FIG. 6 shows perspective views of the peeling unit 4 when open and when closed. The peeling unit 4 when closed, which is shown in FIG. 6, is at the continuous issuing position.

The open position of the peeling unit 4 is a position when the peeling roller cover 41 is opened in accordance with operation to the peeling unit open button 52*b*. That is, the open position of the peeling unit 4 corresponds to the open position of the peeling roller cover 41.

The open position of the peeling roller cover 41 is a position for exposing at least a part of the inside of the printer 1 or at least a part of the inside of the body case 2, as shown in FIG. 2. In one example, as shown in FIG. 2, when the peeling roller cover 41 is at the open position, the coil springs 55, a flexible cable 57 (refer to FIG. 21) connected to the thermal head 28, and so on, inside the body case 2, are exposed. From another point of view, the open position of the peeling roller cover 41 may be defined as a position for exposing the thermal head 28 inside the body case 2. From yet another point of view, the open position of the peeling roller cover 41 may be also defined as a position for allowing opening the peeling roller cover 41 at the corresponding position when the peeling roller holder 42 is at a position facing the back surface of the peeling roller cover 41. As shown in FIG. 6, when the peeling roller cover 41 is at the open position (is open), the peeling roller holder 42 protrudes upward (in a protruding state).

The closed position of the peeling unit 4 is a position when the peeling roller cover 41 is closed. That is, the closed position of the peeling unit 4 corresponds to the closed position of the peeling roller cover 41.

The closed position of the peeling roller cover 41 is a position for covering at least a part of the inside of the printer 1 or at least a part of the inside of the body case 2, which is exposed when the peeling roller cover 41 is at the open position. In one example, as shown in FIGS. 1A and 1, when the peeling roller cover 41 is at the closed position, the coil springs 55, the flexible cable 57, and so on, are not visible from the outside and are covered. From another point of view, the closed position of the peeling roller cover 41 may be defined as a position for covering at least a part of the thermal head 28 inside the body case 2. From yet another point of view, the closed position of the peeling roller cover 41 may be also defined as a position for retaining the peeling roller cover 41 at the corresponding position instead of opening it, when the peeling roller holder 42 is at the position facing the back surface of the peeling roller cover 41. When the peeling roller cover 41 is at the closed position, the position of the peeling roller holder 42 differs between for continuous issuing and for peeling issuing.

As shown in FIG. 6, when the peeling roller cover 41 is at the closed position in continuous issuing, the peeling roller holder 42 is contained under the peeling roller cover 41 (in a contained state).

With reference to FIG. 6, the peeling roller cover 41 is a swing member that has a pair of shafts 41*a* and is thereby able to swing around the shafts 41*a*. The shaft 41*a* has a circular cross section and is inserted in a tubular part (not shown), which is provided to the internal frame, so as to be rotatable. The tubular part is preferably formed with, for example, an elongated hole in the printer front-rear direction so that the shaft 41*a* can be slightly displaced in the printer front-rear direction thereinside. The elongated hole provides play in the printer front-rear direction to the shaft 41*a* that is inserted in the tubular part, and it improves resistance to impact of falling, etc., of the printer 1.

The direction of the elongated hole that is formed in the tubular part is not limited to the printer front-rear direction, and for example, it can be set to any direction such as the upper-lower direction of the printer 1, in a plane perpendicular to the right-left direction of the printer 1.

The peeling roller cover 41 extends in the same direction as the extending direction of the platen roller 10. The peeling roller cover 41 has a surface 411 and a back surface 412. The surface 411 is a surface that is exposed when the peeling roller cover 41 is at the closed position. The back surface 412 is formed with a recess so as to contain the peeling roller holder 42. Conversely, the surface 411 has a swollen shape at the center in the front-rear direction, which is convenient to cut a liner when a cutter is provided to the ejection part 20.

The peeling roller cover 41 is formed with an engaging hole 415 in the vicinity of the shaft 41*a*. As described later, the engaging protrusion 523 of the peeling unit open lever 52 is inserted in the engaging hole 415.

The peeling roller cover 41 may be provided at the side with a pair of U-shaped grooves 413. The U-shaped groove 413 abuts on a protrusion 26 (refer to FIG. 18) that is formed to the internal frame, when the shaft 41*a* is at the closed position. The U-shaped groove 413 functions as a part for positioning in the upper-lower direction of the peeling unit 4 by abutting on the protrusion 26. The U-shaped groove 413 in the state of abutting on the protrusion 26 provides a predetermined gap between the peeling unit 4 and the thermal head 28. Thus, it is possible to reliably prevent interference between the peeling unit 4 and the thermal head 28.

As described above, the shaft 41*a* of the peeling unit 4 is preferably inserted in the elongated hole in the printer front-rear direction, which is formed in the tubular part of the internal frame, whereby play is provided in the printer front-rear direction. Under these conditions, the U-shaped groove 413 in the state of abutting and being engaged with the protrusion 26 (refer to FIG. 18) prevents positional deviation in the printer front-rear direction of the peeling unit 4 (peeling roller cover 41) due to play of the shaft 41*a* inserted in the elongated hole (that is, functions as a part for positioning in the printer front-rear direction of the peeling unit 4).

However, the U-shaped groove 413 and the protrusion 26 are not necessarily provided. The abutting parts of a part of the peeling unit 4 and the internal frame can be formed into any shape as appropriate, in the condition in which they can abut on each other while ensuring the gap between the peeling unit 4 and the thermal head 28. Instead of such an abutting structure, the position in the upper-lower direction of the peeling unit 4 can be determined by, for example, limiting the movable range of the shaft 41*a* of the peeling roller cover 41.

The surface 411 of the peeling roller cover 41 is disposed with a peeling sensor 47. The peeling sensor 47 is an optical reflective sensor that detects presence or absence of a label peeled in peeling issuing. With reference to FIG. 3, a label PL that is peeled by the peeling bar 12 is controlled so that its part on a feeding direction upstream side will be fed and stop in the vicinity of the peeling bar 12, and the peeled label PL thereby remains at the peeling bar 12 by its adhesive strength. The peeling sensor 47 detects presence or absence of this label PL. When the peeled label is picked up by an operator, the peeling sensor 47 detects absence of the label PL, and control is performed to issue a next label.

With reference to FIG. 6, the peeling roller holder 42 is a member that holds the peeling roller 45.

The peeling roller holder 42 extends in the same direction as the extending direction of the platen roller 10, as in the case of the peeling roller cover 41. The peeling roller holder 42 is configured to be contained under the back surface 412 of the peeling roller cover 41. For this purpose, a pair of shafts 42*a* are disposed inward of the pair of shafts 41*a* of the peeling roller cover 41, and the width of the peeling roller holder 42 is made smaller than that of the peeling roller cover 41.

The peeling roller holder 42 is a swing member that has the pair of shafts 42*a* and is thereby able to swing around the shafts 42*a*. The pair of shafts 42*a* are axially supported by the peeling roller cover 41, at positions separated from the shafts 41*a*. The peeling roller 45 is disposed to distal ends of arms 421 extending from the shafts 42*a*. Thus, as shown in FIG. 6, the peeling roller 45 largely protrudes upward based on the shafts 41*a*, when the peeling unit 4 is open.

That is, the peeling roller holder 42 is able to swing between a contained position when the peeling roller 45 is contained under the peeling roller cover 41, and a protruding position when the peeling roller 45 is not covered with the peeling roller cover 41. The protruding position is a position when the peeling roller cover 41 is open, as shown in FIG. 6. The contained position of the peeling roller holder 42 is also a position for facing the back surface 412 of the peeling roller cover 41 as well as a position for being covered with the peeling roller cover 41.

In order to contain the peeling roller holder 42, the peeling roller holder 42 is swung around the shaft 42*a* to the back surface 412 of the peeling roller cover 41, and moreover, the whole peeling roller cover 41 and peeling roller holder 42 are swung around the shaft 41*a*. As a result, the peeling roller holder 42 is compactly contained under the peeling roller cover 41 in such a manner as to be folded down.

On the other hand, when the peeling roller cover 41 is at the open position, the peeling roller holder 42 is able to swing between the contained position and the protruding position. As described later, the peeling roller holder 42 is biased in a direction from the contained position to the protruding position by a coil spring 43. Thus, immediately after the peeling roller cover 41 moves from the closed position to the open position, the peeling roller holder 42 moves in such a manner as to spring out from the contained position to the protruding position. This structure enables an operator to quickly switch from continuous issuing to peeling issuing.

When the peeling roller holder 42 is at the protruding position, the peeling roller 45 is highly protruded. This enables moving the peeling roller 45 to a distant position in setting the peeling unit 4 to the peeling issuing position.

A pair of arms 421 extend from the pair of shafts 42*a*. A shaft 45*a* for rotating the peeling roller 45 and auxiliary rollers 46 is disposed at the distal ends of the pair of arms 421. Each of the auxiliary rollers 46 has a diameter smaller than that of the peeling roller 45. Providing the auxiliary rollers 46 on both sides of the peeling roller 45 enables smoothly ejecting a wide liner in peeling issuing of a wide label. If the auxiliary rollers 46 were not provided, a wide liner would be able to move in the width direction (right-left direction); but providing the auxiliary rollers 46 enables stably feeding a wide liner.

However, the auxiliary rollers 46 are not necessarily provided. In the case of not using the auxiliary rollers 46, peeling issuing can be executed in the condition in which the peeling roller 45 is provided.

Each of the arms 421 is formed with a protrusion 422 that protrudes outward. As described later, the protrusion 422 is provided so as to engage the peeling unit 4 with the printer cover 3 in peeling issuing.

As shown in FIG. 6, a pair of coil springs 43 are provided in the vicinity of the pair of shafts 42*a* of the peeling roller holder 42. Although not shown, the coil spring 43 is coupled to the peeling roller holder 42 at one end and is also coupled to the peeling roller cover 41 at the other end, and it thereby biases the peeling roller holder 42 in the direction for swinging from the contained position to the protruding position. With this structure, when the peeling roller cover 41 is at the open position (that is, the peeling unit 4 is at the open position), the peeling roller holder 42 is at the protruding position at any time.

Figure 7:
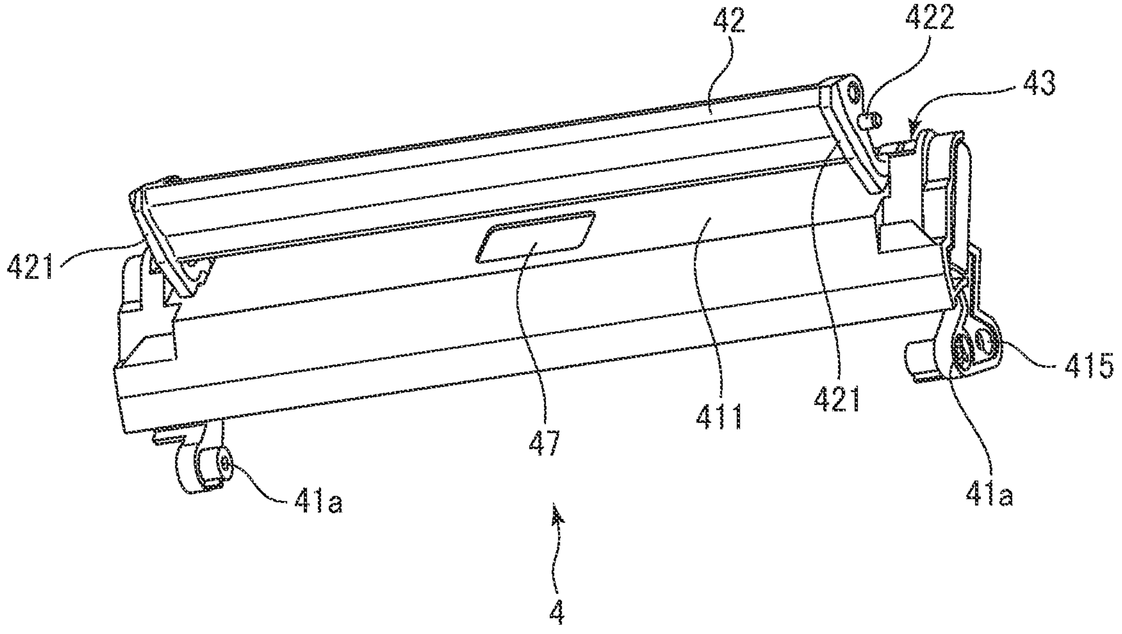
FIG. 7 is a perspective view of the peeling unit when open, as seen from a viewpoint different from that of FIG. 6.

FIG. 7 is a perspective view of the peeling unit 4 when open, as seen from a viewpoint different from that of FIG. 6. In the state in which the peeling roller holder 42 is at the protruding position, the arms 421 of the peeling roller holder 42 partially abut on the surface 411 of the peeling roller cover 41. In other words, the surface 411 of the peeling roller cover 41 functions as a stopper for the peeling roller holder 42 that is swung by the coil spring 43.

Next, movements in making the peeling unit 4 be at the open position from the state in continuous issuing, will be described with reference to FIGS. 8 and 9.

Figure 8:
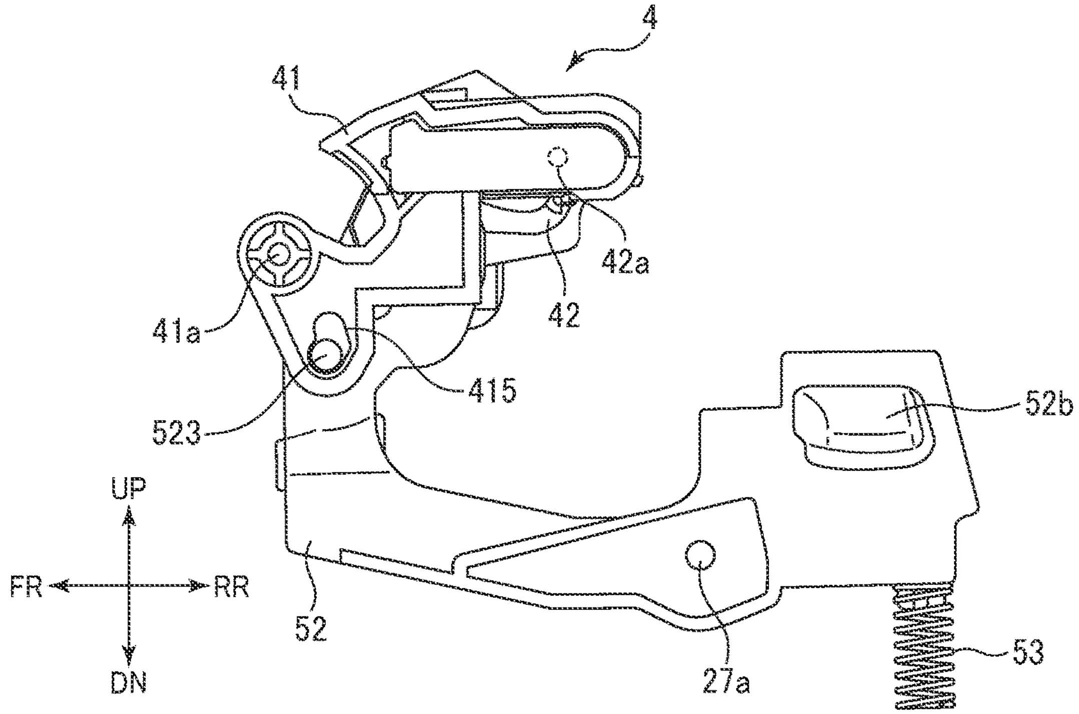
FIG. 8 illustrates relationships between a peeling unit open lever and the peeling unit when continuous issuing is performed and when a peeling unit open button is operated.
Figure 8:
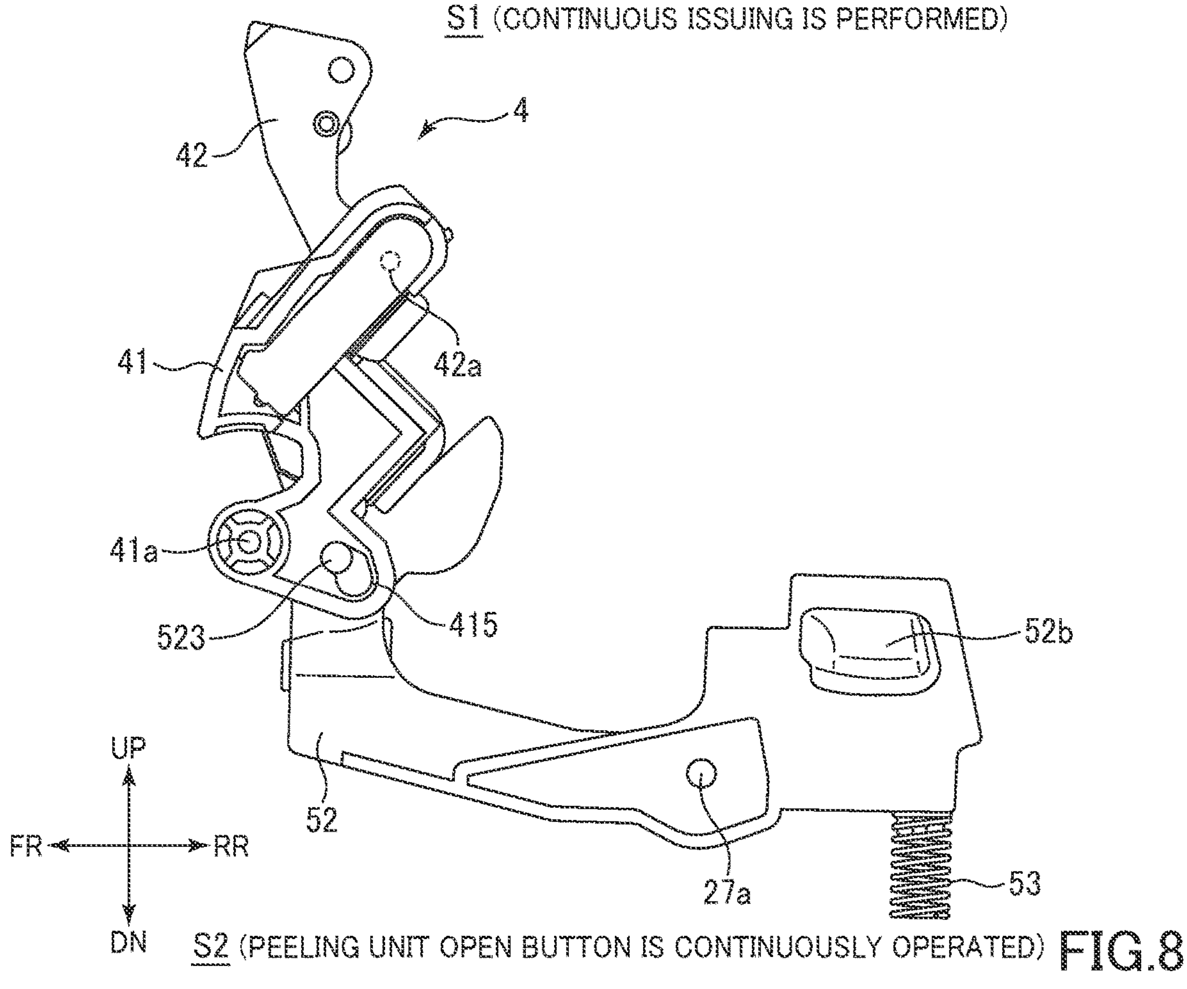
Figure 9:
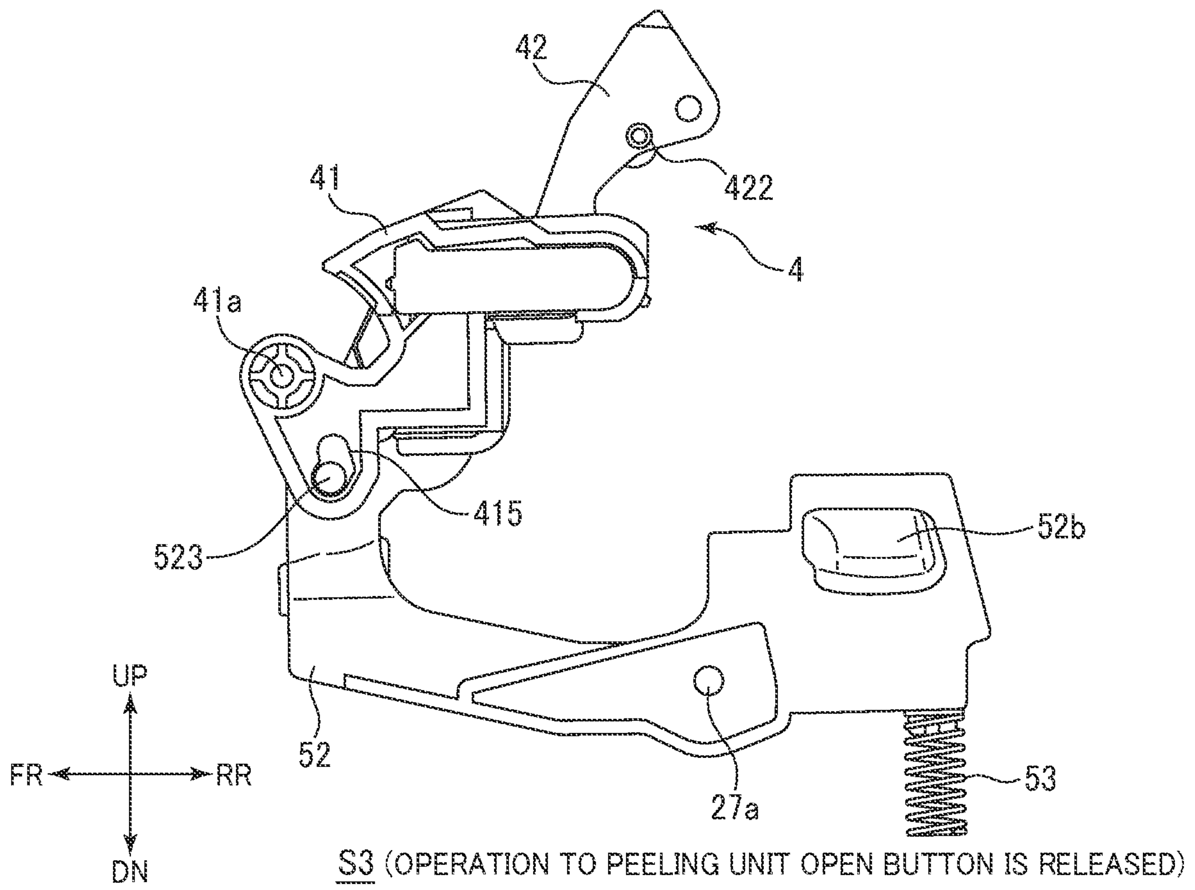
FIG. 9 illustrates relationships between the peeling unit open lever and the peeling unit when continuous issuing is performed and when the peeling unit open button is operated.

FIGS. 8 and 9 sequentially show side views of the peeling unit open lever 52 and the peeling unit 4, from states S1 to S3.

The state S1 shows a state in which the printer cover 3 is open in continuous issuing. The state S2 shows a state of continuously operating the peeling unit open button. The state S3 shows a state of releasing operation of the peeling unit open button.

The peeling unit open lever 52 and the peeling unit 4 are engaged with each other by inserting the engaging protrusion 523 of the peeling unit open lever 52 in an engaging hole 415 of the peeling roller cover 41, from the inside. The peeling unit open lever 52 swings so as to move the peeling roller cover 41 between the closed position and the open position.

The engaging hole 415 has, for example, a heart shape, and it allows the engaging protrusion 523 to move therein.

As shown by the state S1 in FIG. 8, when the printer cover 3 is open in continuous issuing, the engaging protrusion 523 is positioned on a lower side in the engaging hole 415. In this state, the peeling roller holder 42 is at the contained position under the back surface 412 (refer to FIG. 6) of the peeling roller cover 41.

When the peeling unit open button 52*b* is pressed (operated) down, the peeling unit open lever 52 swings around the shaft 27*a* in a clockwise direction in FIG. 8. In response to this, the engaging protrusion 523 of the peeling unit open lever 52 moves upward in the engaging hole 415 and upwardly presses the peeling roller cover 41, at an upper rim of the engaging hole 415. The peeling roller cover 41 is thereby swung around the shaft 41*a* to the open position in a counterclockwise direction in FIG. 8. As described above, the peeling roller holder 42 is biased in the direction for swinging from the contained position to the protruding position, by the coil spring 43 (refer to FIG. 6). Thus, as the peeling roller cover 41 swings to the open position, a position restriction of the peeling roller holder 42 due to a second stopper 522 is released to form space in which the peeling roller holder 42 is able to swing. As a result, the peeling roller holder 42 swings to the protruding position, as shown by the state S2 in FIG. 8. The second stopper 522 will be described later.

As shown by the state S2 in FIG. 8, the position of the shaft 42*a* is higher when the peeling roller cover 41 is at the open position than when the peeling roller cover 41 is at the closed position. In addition, as described above, in the printer 1, space is formed in which the peeling roller holder 42 is able to swing from the contained position to the protruding position, when the peeling roller cover 41 is at the open position. Thus, the peeling roller holder 42 springs up by the biasing force of the coil spring 43.

When pressing down of the peeling unit open button 52*b* is released from the state shown by the state S2, the peeling unit open lever 52 swings around the shaft 27*a* in the counterclockwise direction in FIG. 8, with the restoring force of the coil spring 53. The peeling unit open lever 52 and the peeling roller cover 41 thereby return to the positions in the state S1. Meanwhile, the peeling roller holder 42, which swings to the protruding position once, remains at the protruding position, instead of returning to the contained position. As a result, the peeling unit 4 is in the condition shown by the state S3 in FIG. 9.

Engagement Between Peeling Unit 4 and Printer Cover 3

In the printer 1, the peeling unit 4 is set to the peeling issuing position while the printer cover 3 and the peeling unit 4 are engaged with each other, by swinging the printer cover 3 from the open position to the closed position in the state S3 in FIG. 9.

Hereinafter, engagement between the peeling unit 4 and the printer cover 3 in peeling issuing will be described with reference to FIGS. 10A, 10B, and 11.

First, the structure of the printer cover 3 for engaging with the peeling unit 4 will be described with reference to FIGS. 10A and 10B. FIG. 10A is a plane view of the printer cover 3, and FIG. 10B is an enlarged view of an A-A cross section in FIG. 10A.

Figure 10A:
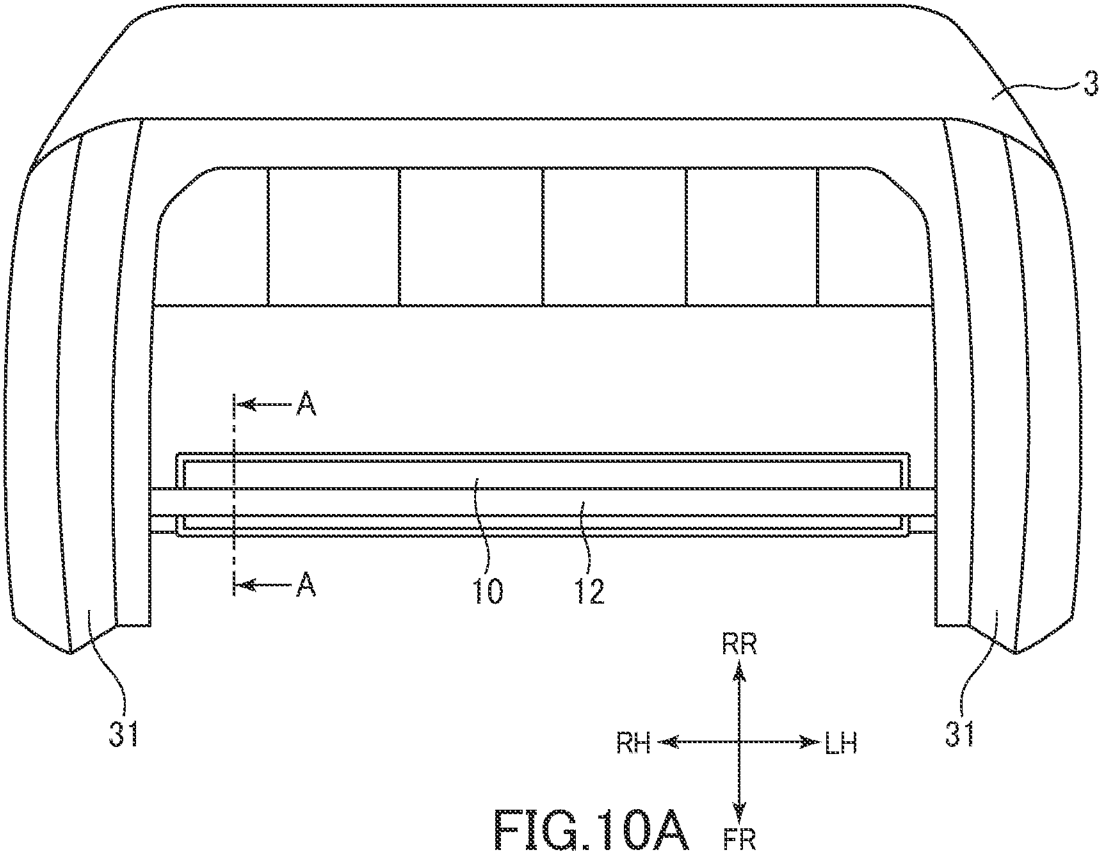
FIG. 10A is a plane view of the printer cover of the printer of the embodiment.

As shown in FIG. 10A, the printer cover 3 has a pair of peeling unit-receiving parts 31 at front ends. The peeling unit-receiving part 31 is provided in the vicinity of the position at which the platen roller 10 and the peeling bar 12 are supported.

Figure 10B:
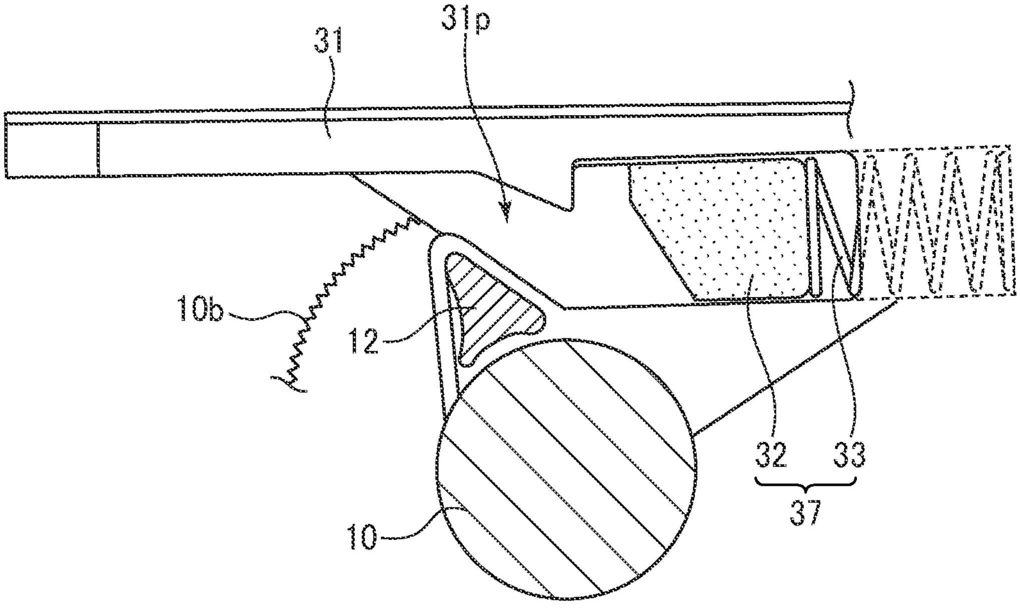
FIG. 10B is an A-A cross section in FIG. 10A.

As shown in FIG. 10B, the peeling unit-receiving part 31 is formed with a guide groove 31*p* that opens forward. The guide groove 31*p* is a groove that opens only to the inside along a direction from the front end to a rear end of the printer cover 3. The guide groove 31*p* receives the protrusion 422 (refer to FIG. 9) of the peeling unit 4 that is positioned on a front side, in the process of closing the printer cover 3.

A roller-pressing mechanism 37 is provided in the guide groove 31*p*. As described later, the roller-pressing mechanism 37 presses the peeling roller 45 to the platen roller 10 to generate a nip pressure for nipping a liner between the peeling roller 45 and the platen roller 10, when the printer cover 3 is at the closed position.

The roller-pressing mechanism 37 includes an abutting part 32 that is disposed in the guide groove 31*p* and also includes a coil spring 33 that is disposed behind the abutting part 32. In accordance with the printer cover 3 being moved to the closed position, the protrusion 422 of the peeling unit 4 is guided to the abutting part 32.

When operation to move the printer cover 3 from the open position to the closed position is performed in the state S3 in FIG. 9, the protrusion 422 of the peeling unit 4 enters the guide groove 31*p* of the peeling unit-receiving part 31 during the process of moving the printer cover 3. As the printer cover 3 swings to the closed position, the protrusion 422 advances toward the rear of the printer cover 3 along the guide groove 31*p* and abuts on the abutting part 32. In this manner, the printer cover 3 engages with the peeling unit 4. When the printer cover 3 reaches the closed position, the peeling roller 45 of the peeling unit 4 engaging with the printer cover 3 is at a position facing the platen roller 10.

Thus, it is possible for an operator to engage the printer cover 3 with the peeling unit 4 while moving the peeling unit 4 to the peeling issuing position, only by operation to close the printer cover 3.

Figure 11:
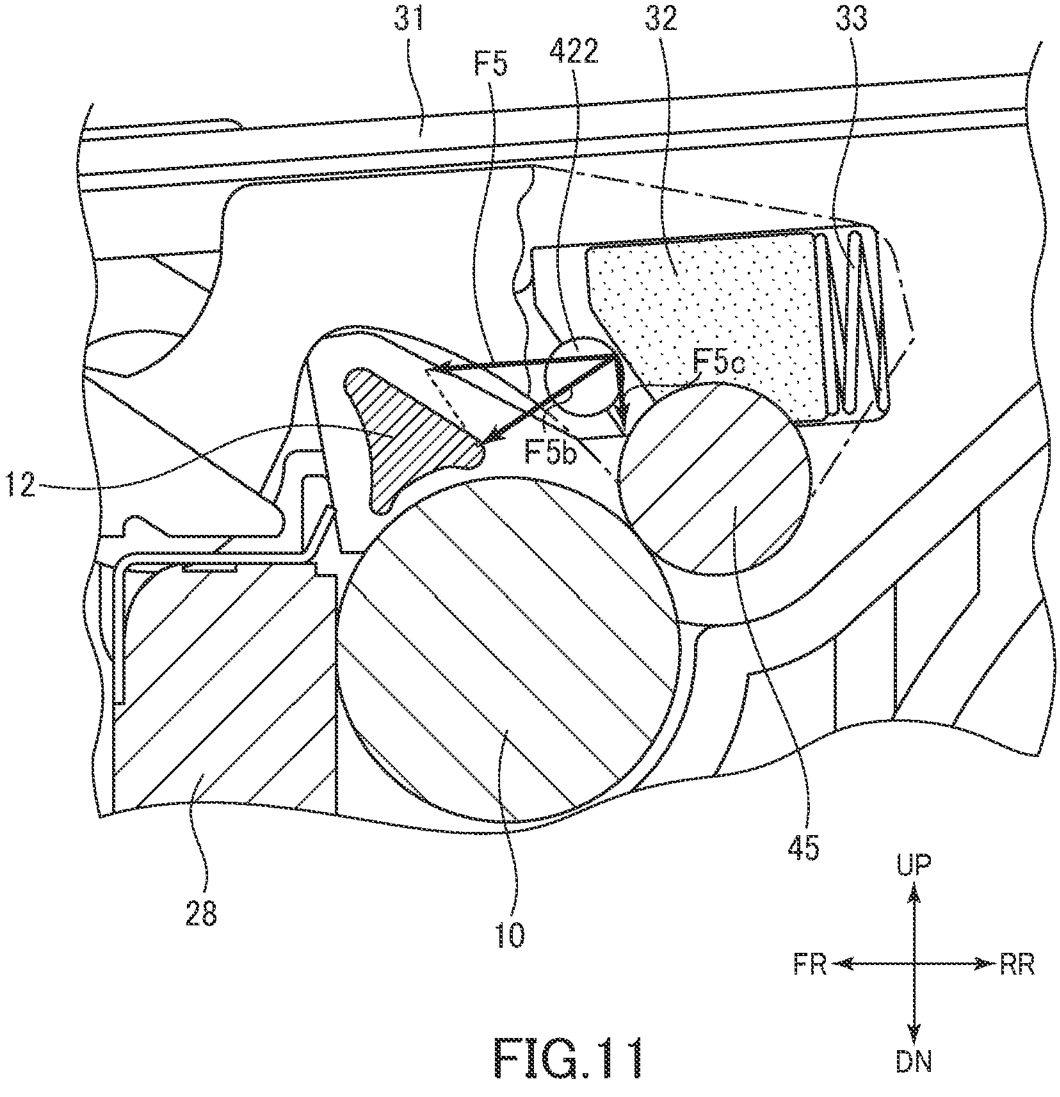
FIG. 11 is an enlarged sectional view of a part in the vicinity of a peeling roller when peeling issuing is performed.

FIG. 11 is an enlarged sectional view showing a part in the vicinity of the platen roller 10 when the printer cover 3 is completely closed and the peeling unit 4 is set to the peeling issuing position.

As shown in FIG. 11, when the printer cover 3 is at the closed position, the peeling roller 45 of the peeling unit 4 is disposed at a position facing the platen roller 10. In this state, the protrusion 422 of the peeling unit 4 abuts on the abutting part 32 of the peeling unit-receiving part 31 of the printer cover 3 to compress the coil spring 33 behind the abutting part 32. A restoring force of the coil spring 33 acts on the peeling roller 45 via the protrusion 422 and thereby makes the peeling roller 45 press the platen roller 10, resulting in generation of a nip pressure for nipping a liner. With this structure, a force in a rotation direction around the shaft 42*a* of the peeling roller holder 42 (F5*c* in FIG. 11) is converted into a nip pressure between the peeling roller 45 and the platen roller 10.

In an embodiment, a normal line direction of an abutting surface of the abutting part 32 abutted with the protrusion 422 (direction denoted by a reference symbol "F5*b*"), and a direction from the center of the peeling roller 45 to the center of the platen roller 10, may be the same in a side view, as shown in FIG. 11. However, the direction of the force F5 varies depending on the abutting angle between the protrusion 422 and the abutting part 32, and therefore, these directions may not be the same. As shown in FIG. 11, a component force F5*b* being a normal component with respect to the abutting surface, of a reaction force F5 of the abutting part 32 acting on the protrusion 422, causes the peeling roller 45 to press the platen roller 10, whereby a nip pressure for nipping a liner is more effectively generated.

Movement for Containing Peeling Roller Holder 42

Next, movement for moving the peeling roller holder 42 at the protruding position to contain it under the peeling roller cover 41 and setting the peeling unit 4 to the continuous issuing position, will be described with reference to FIGS. 12 and 13.

In order to switch from peeling issuing to continuous issuing, the cover open button 51*b* is pressed down to open the printer cover 3, and the peeling unit open button 52*b* is then pressed down. In response to this, as shown by the state S2 in FIG. 8, the peeling roller cover 41 swings to the open position, and the peeling roller holder 42 swings to the protruding position. In this state, operation to fold down the peeling roller holder 42 to contain it under the peeling roller cover 41 (folding operation) is performed by an operator, whereby the peeling unit 4 is set to the continuous issuing position.

Figure 12:
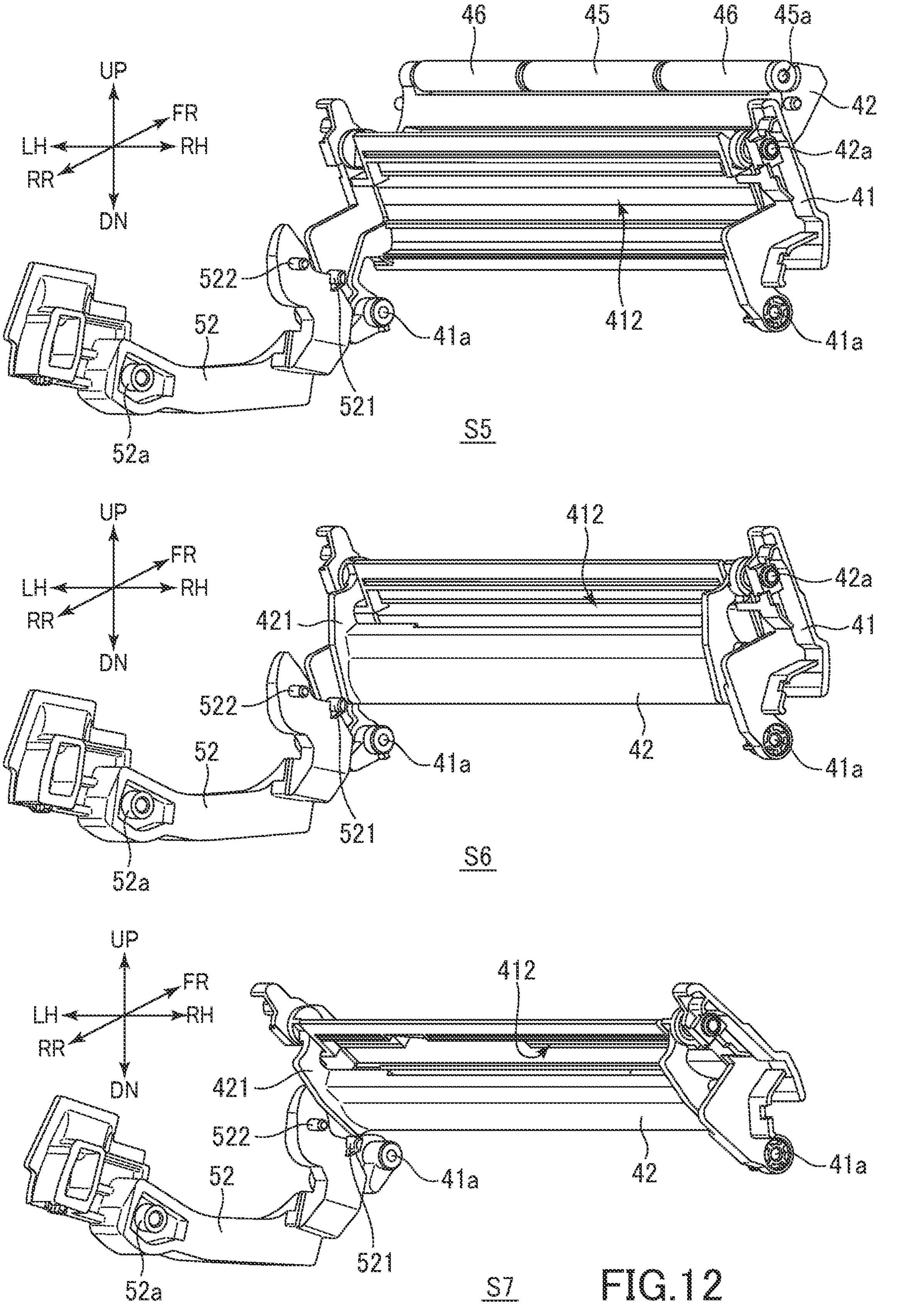
FIG. 12 illustrates movements of folding down the peeling unit.
Figure 13:
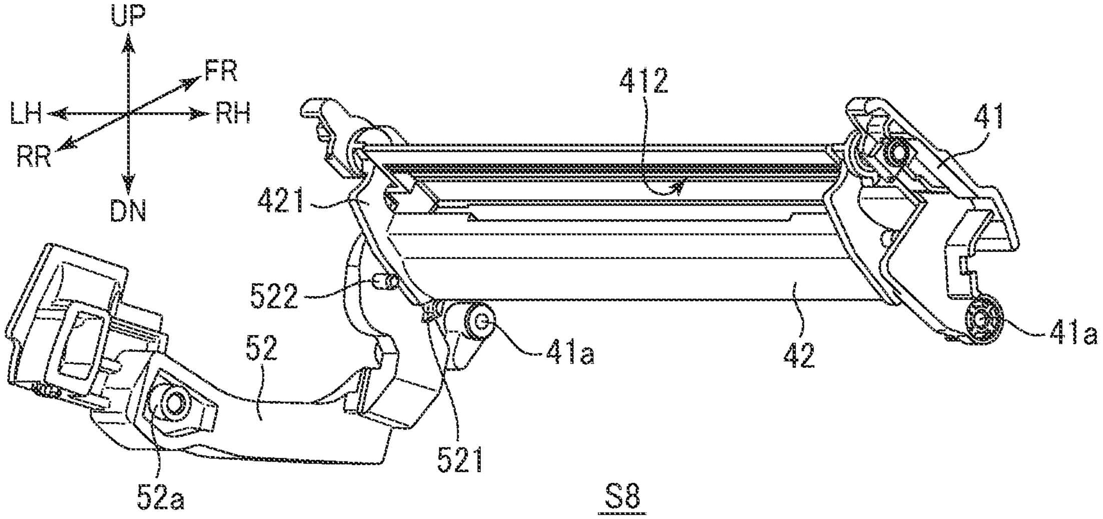
FIG. 13 illustrates movements of folding down the peeling unit.
Figure 13:
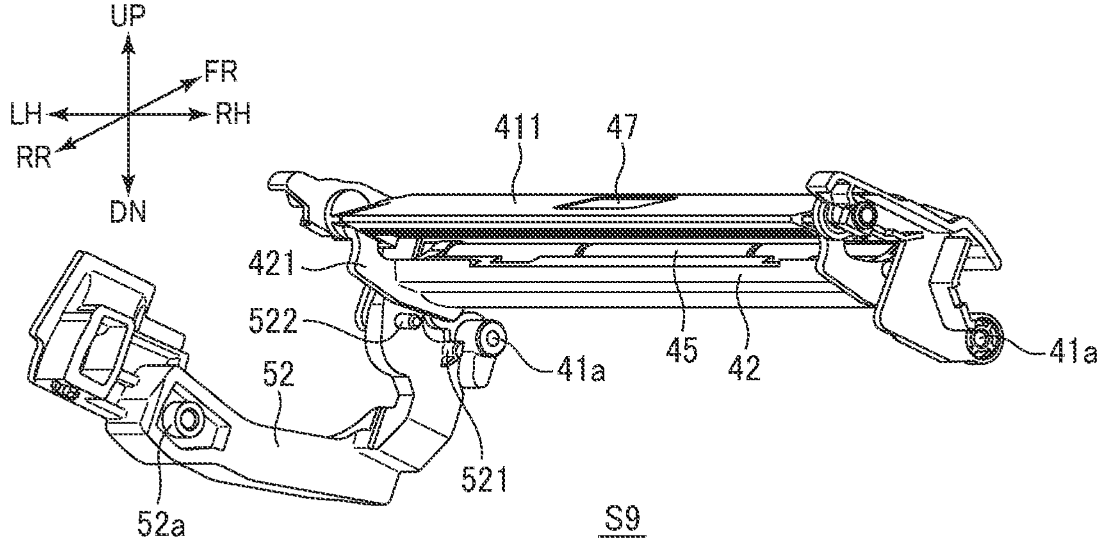

FIGS. 12 and 13 sequentially show perspective views of the peeling unit open lever 52 and the peeling unit 4 when an operator performs the folding operation of the peeling unit 4, from states S5 to S9.

As shown in FIG. 12, the peeling unit open lever 52 has a first stopper 521 and a second stopper 522 that protrude inward. The first stopper 521 and the second stopper 522 are disposed separately in the front-rear direction and are provided so as to abut on the arm 421 of the peeling roller holder 42 and thereby restrict swinging of the arm 421.

The state S5 in FIG. 12 is a state in which the peeling roller cover 41 is at the open position and the peeling roller holder 42 is at the protruding position, which corresponds to the state S2 in FIG. 8. An operator can maintain this state by continuously pressing down the peeling unit open button 52*b*.

In the state S5, an operator may rotate (or swing) the peeling roller holder 42 around the shaft 42*a* and move it to the contained position under the back surface 412 of the peeling roller cover 41. Thus, the state is changed to the state S6. At this time, a part most distant from the shaft 42*a* of the arm 421 crosses over the first stopper 521 by the operating force of the operator. This makes the arm 421 abut on the first stopper 521 to restrict swinging of the peeling roller holder 42, against the restoring force of the coil spring 43 (refer to FIG. 6). That is, when the peeling roller holder 42 is in the contained position and the peeling roller cover 41 is at the open position, the first stopper 521 abuts on the arm 421 to restrict swinging of the peeling roller holder 42. In the state in which the first stopper 521 restricts swinging of the peeling roller holder 42, it is easy to move the peeling roller cover 41 to the closed position while retaining the peeling roller holder 42 at the contained position. If the first stopper 521 were not provided, an operator would need to move the peeling roller cover 41 to the closed position by releasing pressing down the peeling unit open button 52*b* while holding the peeling roller holder 42 by hand so as to prevent it from swinging from the contained position. Thus, providing the first stopper 521 improves operability.

When the operator releases pressing down the peeling unit open button 52*b* in the state in which the peeling roller holder 42 is locked at the contained position by the first stopper 521, the peeling roller cover 41 starts moving to the closed position. The state S7 shows a state while the peeling roller cover 41 is moving to the closed position.

In the process in which the peeling roller cover 41 moves to the closed position, restriction of swinging of the arm 421 by the first stopper 521 is released in accordance with swinging of the peeling roller cover 41. Specifically, an outer edge of the arm 421 is formed so that restriction of swinging of the arm 421 will be released at the time the peeling roller cover 41 is closed to a predetermined angle.

The state S8 in FIG. 13 is a state at the time the operator further closes the peeling roller cover 41 from the state S7. The peeling roller holder 42, in which restriction of swinging by the first stopper 521 is released, is swung by the restoring force of the coil spring 43, but it is again restricted from swinging by the second stopper 522, which is on a rear side of the first stopper 521. That is, the second stopper 522 comes into contact with the arm 421 while the peeling roller holder 42 moves from the open position to the closed position, whereby it restricts the peeling roller holder 42 from swinging between the contained position and the protruding position. The state S9 is a state in which the peeling roller cover 41 is at the closed position and the peeling unit 4 is at the continuous issuing position.

Providing the second stopper 522 prevents the peeling roller holder 42 from swinging while the peeling roller cover 41 moves from the open position to the closed position. Moreover, the second stopper 522 is positioned rearward of the first stopper 521, and thus, when the peeling unit open button 52*b* is operated in the state in which the peeling unit 4 is at the continuous issuing position as shown by the state S9, the peeling roller holder 42 smoothly swings to the protruding position.

The first stopper 521 and the second stopper 522 are not necessarily provided. Providing even only one of the stoppers can contribute to improving operability. It is also possible to perform the folding operation of the peeling unit 4, even when both of the first stopper 521 and the second stopper 522 are not provided. Specifically, it is possible for an operator to contain the peeling roller holder 42 under the peeling roller cover 41 by carefully moving the peeling roller cover 41 to the closed position while holding the peeling roller holder 42 at the contained position by hand.

Movement to Switch Between Continuous Issuing and Peeling Issuing of Printer 1

Next, movement to switch between continuous issuing and peeling issuing of the printer 1 will be described with reference to FIGS. 14 and 15.

Figure 14:
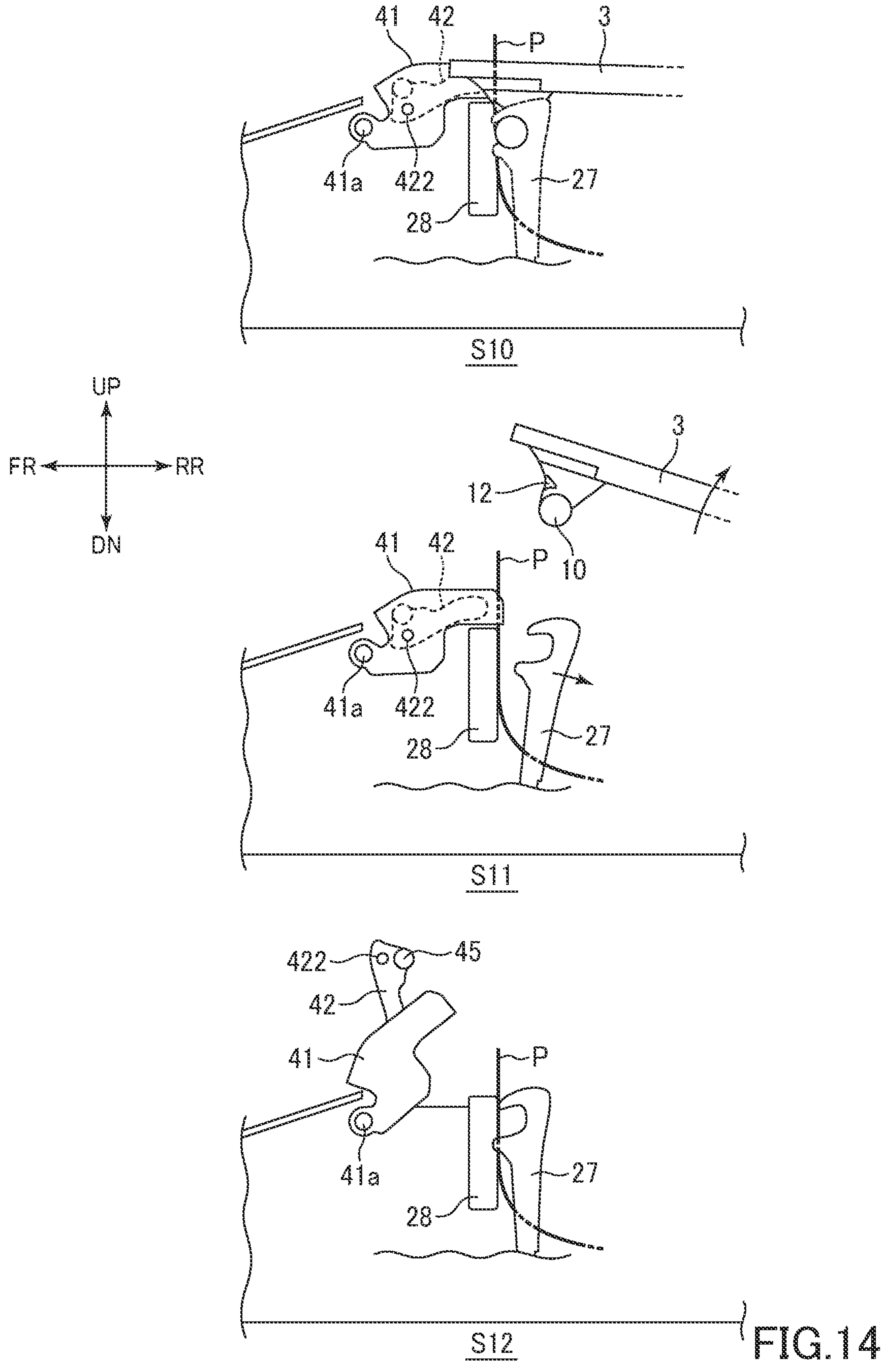
FIG. 14 sequentially shows movements in switching from continuous issuing to peeling issuing in the printer of the embodiment.
Figure 15:
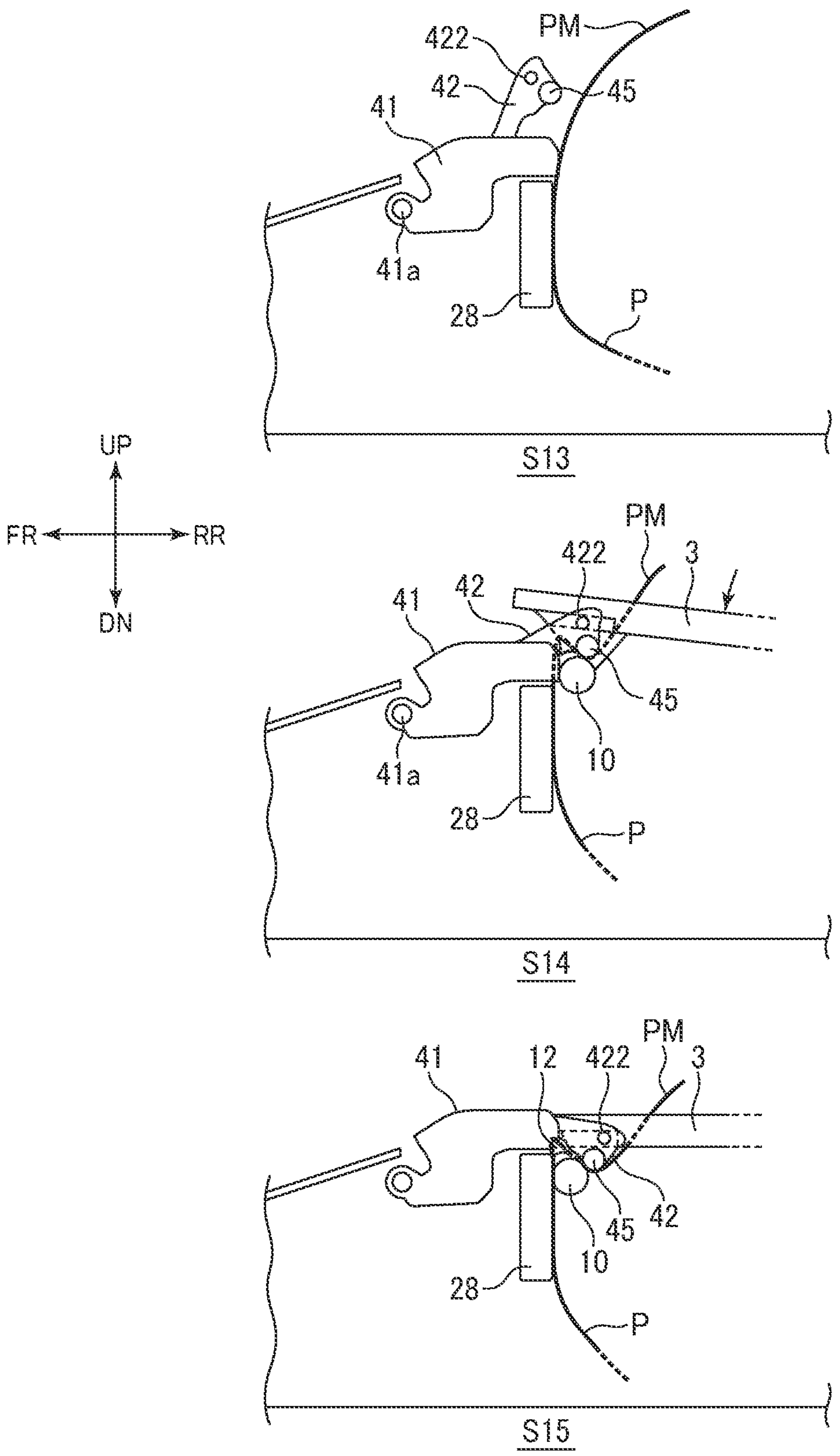
FIG. 15 sequentially shows movements in switching from continuous issuing to peeling issuing in the printer of the embodiment.

FIGS. 14 and 15 sequentially show side views of a main part of the printer 1 at the time of switching from continuous issuing to peeling issuing, from states S10 to S15. FIG. 15 omits illustration of the platen-holding bracket 27.

The state S10 in FIG. 14 shows a state of the printer 1 in continuous issuing. In this state, the platen shaft 10*a* of the platen roller 10, which is axially supported by the printer cover 3, is fitted in the groove 27*b* of the platen-holding bracket 27, whereby the printer cover 3 is held. In the state S10, the peeling unit 4 is set to the continuous issuing position.

When an operator presses down the cover open button 51*b* in the state S10, holding of the platen shaft 10*a* by the platen-holding bracket 27 is released. Then, as shown by the state S11, the printer cover 3 is moved to the open position by the biasing force of the torsion spring provided to the hinge 8 (refer to FIG. 2).

Subsequently, when the operator presses down the peeling unit open button 52*b*, the peeling roller cover 41 swings from the closed position to the open position, and the peeling roller holder 42 swings from the contained position to the protruding position, as shown by the state S12. Then, when the operator releases pressing down of the peeling unit open button 52*b*, the peeling roller cover 41 returns to the closed position, but the peeling roller holder 42 remains at the protruding position with the biasing force of the coil spring 43 (refer to FIG. 6), as shown by the state S13 in FIG. 15.

Next, in accordance with the printer cover 3 being closed by the operator, the protrusion 422 of the peeling roller holder 42 at the protruding position is inserted in the guide groove 31*p* (refer to FIG. 10B) of the printer cover 3 and is guided therealong, whereby the printer cover 3 and the peeling unit 4 engage with each other, as shown by the state S14.

As shown by the state S15, when the printer cover 3 reaches the closed position, the platen shaft 10*a* of the platen roller 10 is held by the platen-holding bracket 27, and the peeling unit 4 is set to the peeling issuing position. That is, the peeling roller 45 of the peeling unit 4 is disposed at the position facing the platen roller 10 to nip the liner PM with the platen roller 10. In this state, as described above, the protrusion 422 that is engaged with the printer cover 3 is pressed by the coil spring 33 (refer to FIG. 11), whereby an appropriate nip pressure against the platen roller 10 is generated in the peeling roller 45.

In peeling issuing, a label PL that is printed by the thermal head 28 is peeled from the liner PM, due to the liner PM being quickly turned by the peeling bar 12. The peeling roller 45 is driven to rotate in accordance with rotation of the platen roller 10 and ejects the liner PM.

In order to switch from peeling issuing to continuous issuing, the cover open button 51*b* is pressed down to open the printer cover 3, and the peeling unit open button 52*b* is then pressed down. This causes the peeling roller cover 41 of the peeling unit 4 to swing to the open position and also causes the peeling roller holder 42 to swing to the protruding position. Thereafter, as described with reference to FIGS. 12 and 13, the folding operation of the peeling unit 4 is performed to set the peeling unit 4 to the continuous issuing position.

As described above, the printer 1 of the embodiment includes the peeling unit 4 that is movable between the continuous issuing position and the peeling issuing position. When the peeling unit 4 is at the continuous issuing position, the peeling roller holder 42 holding the peeling roller 45 is compactly contained at the contained position under the back surface of the peeling roller cover 41.

Switching from continuous issuing to peeling issuing is performed by a simple operation as follows: opening the printer cover 3; operating the peeling unit open button 52*b* to move the peeling roller holder 42 to the protruding position; and closing the printer cover 3. That is, switching can be performed by a simple action of these easy three steps, and operability is excellent. In addition, when the printer cover 3 is at the closed position, the peeling roller 45 is pressed against the platen roller 10 by the roller-pressing mechanism 37 of the printer cover 3, resulting in generation of an appropriate nip pressure.

Conversely, switching from peeling issuing to continuous issuing is performed as follows: opening the printer cover 3;

operating the peeling unit open button 52*b* to move the peeling roller holder 42 to the protruding position; performing the folding operation to move the peeling roller holder 42 to the contained position; and closing the printer cover 3. Also in this case, the operation is simple.

Method of Mounting and removing Thermal Head 28

Next, a method of mounting and removing the thermal head 28 to and from the printer 1 will be described with reference to FIGS. 16A to 19.

Figure 16A:
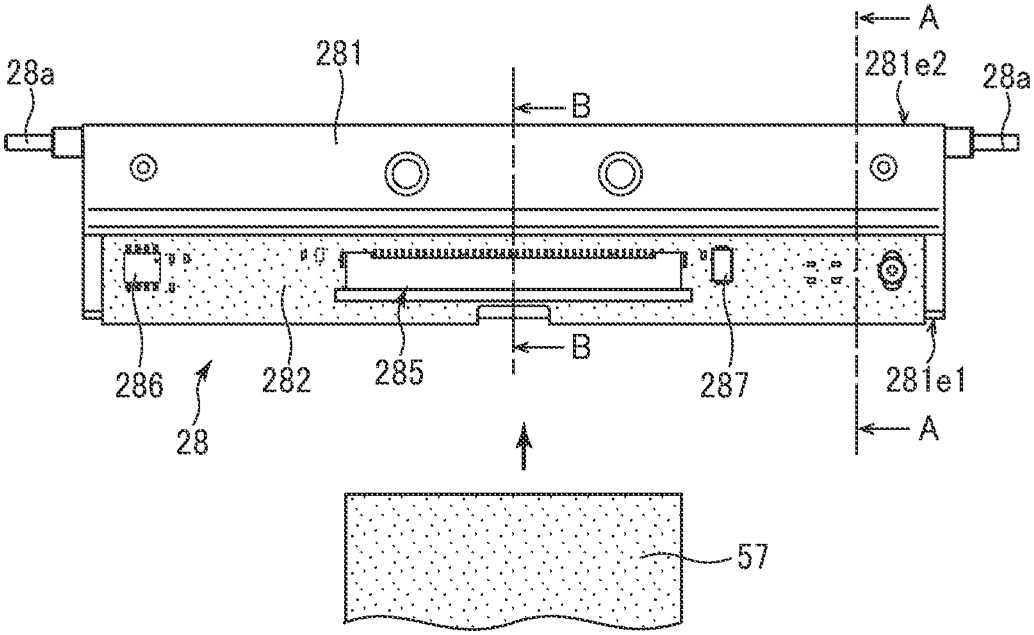
FIG. 16A shows a front side of a thermal head.
Figure 16B:
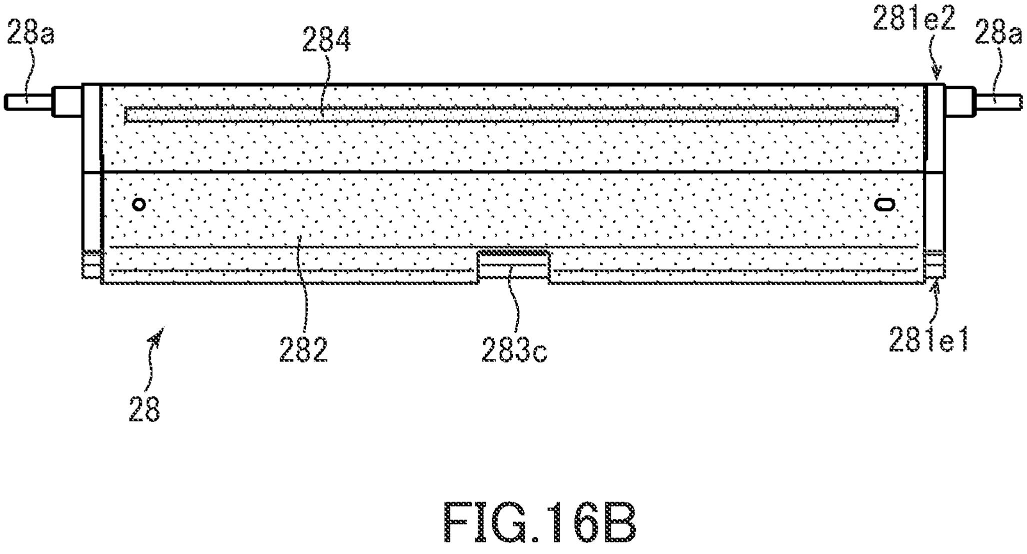
FIG. 16B shows a rear side of the thermal head.
Figure 17:
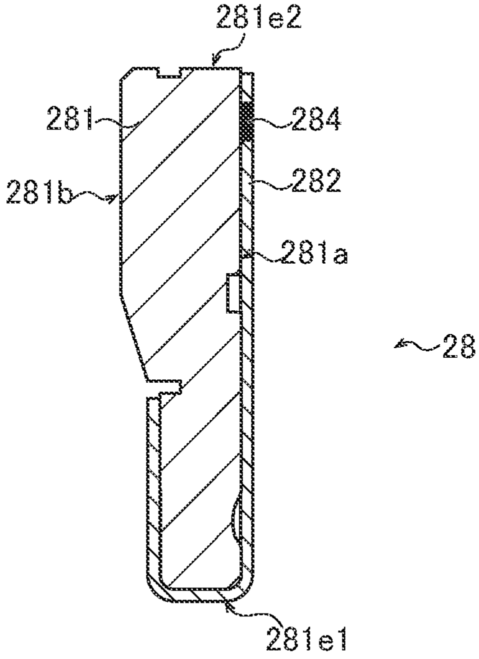
FIG. 17 shows enlarged sectional views of an A-A cross section and a B-B cross section in FIG. 16A.
Figure 17:
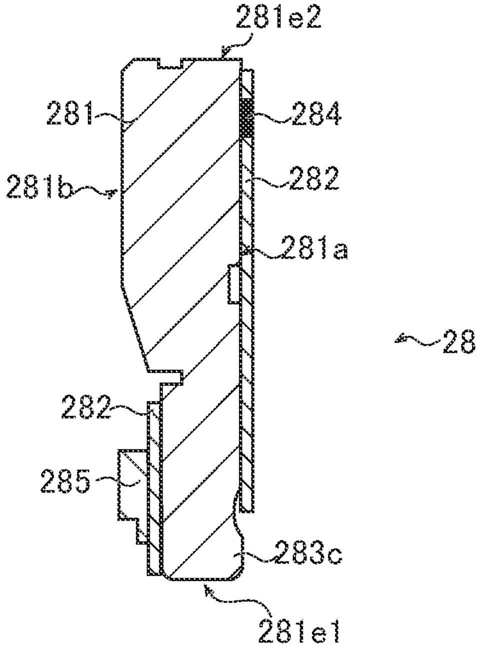

FIG. 16A shows a front side biased by the coil spring 55, which is one of both surfaces of the thermal head 28, and FIG. 16B shows a rear side of the thermal head 28. The rear side of the thermal head 28 faces the platen roller 10. FIG. 17 shows enlarged sectional views of an A-A cross section and a B-B cross section in FIG. 16A.

As shown in FIGS. 16A and 17, the thermal head 28 has a structure in which a board 282 is attached to a heat dissipation plate 281 that has a substantially rectangular shape in a plane view. The heat dissipation plate 281 is made of a metal material having a high thermal conductivity, such as aluminum. The A-A cross section in FIG. 17 shows that the board 282 is attached to the heat dissipation plate 281 in such a manner as to extend from a surface 281*a* of the heat dissipation plate 281 to a back surface 281*b* on a side opposite to the surface 281*a*, via a first end part 281*e*1 interposed therebetween. The board 282 is, for example, a ceramic board.

The surface 281*a*, which faces a rear side of the printer 1, is an example of a first surface. The back surface 281*b*, which faces a front side of the printer 1, is an example of a second surface. As shown in FIG. 16B and by the B-B cross section in FIG. 17, a cutout 283*c* (an example of an opening part) is provided at a substantially center position in a longitudinal direction (lateral direction) of the surface 281*a* of the thermal head 28. The cutout 283*c* does not have the board 282 and exposes the surface 281*a* of the heat dissipation plate 281. As described later, the cutout 283*c* is configured to be in contact with a protrusion 211 (refer to FIG. 20) for allowing the thermal head 28 to swing.

As shown in FIG. 16A and by the A-A cross section in FIG. 17, the board 282 that is attached to the back surface 281*b* of the heat dissipation plate 281 is mounted with, but not limited to, surface-mount devices (SMDs) such as a connector 285, an EEPROM 286 (an example of a memory chip), and a diode 287. In the state in which the thermal head 28 is mounted to the printer 1, the flexible cable 57 is connected to the connector 285. The flexible cable 57 transmits a signal from the circuit board (not shown) of the printer 1 to the thermal head 28.

In the state in which the thermal head 28 is mounted to the printer 1, the relatively tall surface-mount devices (e.g., the connector 285, the EEPROM 286, and the diode 287 in FIG. 16A), which are mounted on the back surface 281*b* of the heat dissipation plate 281, face the front side of the printer 1. This configuration protects these surface-mount devices from water, etc., which may enter from the ejection part 20 on a rear side of the thermal head 28. A driver IC (not shown) is mounted in the vicinity of a heat generating part 284 on the rear side of the thermal head 28 facing the ejection part 20 (on a side on which the surface 281*a* of the heat dissipation plate 281 is provided). Due to the driver IC with low height, the driver IC and wiring are protected together with the heat generating part 284 by a protective layer or a coating layer, whereby they are unlikely to be damaged by water entering from the ejection part 20.

As shown in FIG. 16B, the tall surface-mount devices, such as the connector, are not disposed on the rear side of the thermal head 28 (on the side disposed with the heat generating part 284). Thus, a feed angle of a label PL relative to the heat generating part 284 can be small (in other words, it can be an angle approximately perpendicular to the heat generating part 284 in a side view) (refer to FIG. 3). Here, good print quality is obtained due to the following reasons. The heat generating part 284 includes a glaze layer (partial graze) generally having a protrusion shape, and it thereby has a protrusion shape as a whole. If tall surface-mount devices are disposed on the rear side of the thermal head 28, the feeding angle of a label PL relative to the heat generating part 284 is made large in order to avoid the tall surface-mount devices. In this case, due to the heat generating part 284 having a protrusion shape and to stiffness (resilience) of a label PL, the label PL tends to rise from the heat generating part 284 at the position thereof, and it is difficult to apply an appropriate printing pressure to the label PL between the heat generating part 284 and the platen roller 10. In contrast, for a small feeding angle of a label PL relative to the heat generating part 284, although having a protrusion shape, the heat generating part 284 pinches a label PL with the platen roller 10 by applying an appropriate printing pressure, in the vicinity of a top of the heat generating part 284. Thus, good print quality is obtained.

A pair of shafts 28*a* that extend outward are coupled to both end surfaces of the heat dissipation plate 281. As described later, the pair of shafts 28*a* are provided in order to mount the thermal head 28 to the internal frame of the printer 1. As shown in FIGS. 16A and 16B, the shaft 28*a* has a large-diameter part joined to the heat dissipation plate 281 and has a small-diameter part extending outward from the large-diameter part, and it thereby has a high strength. The small-diameter part of the shaft 28*a* is inserted in a shaft-receiving groove 25, which will be described later.

Figure 18:
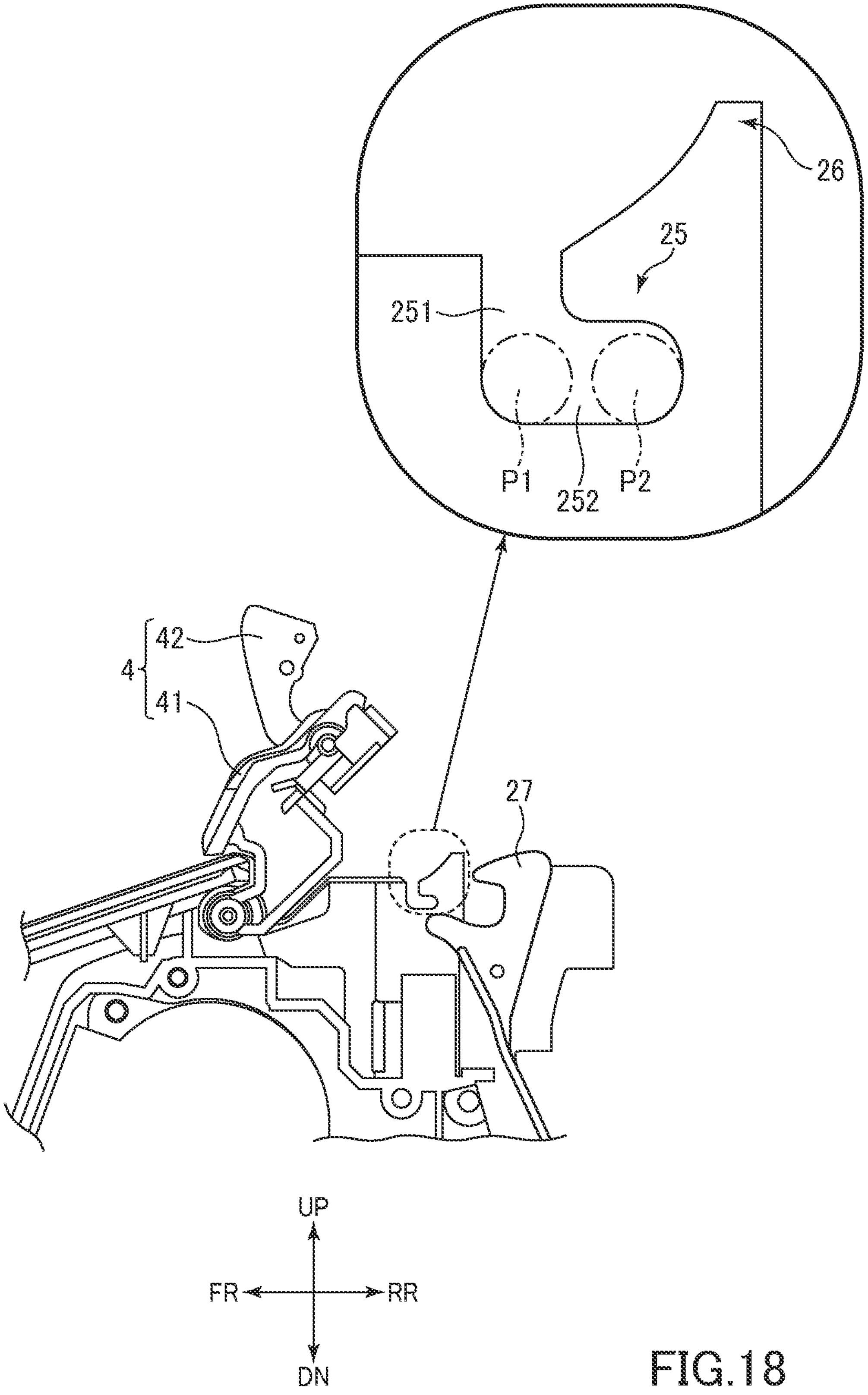
FIG. 18 is a partial sectional view of the printer, including a shaft-receiving groove for the thermal head.

FIG. 18 is a partial sectional view of the printer 1 in a plane perpendicular to the right-left direction, in the state in which the peeling unit open button 52*b* is continuously pressed down to make the peeling roller cover 41 be at the open position and to make the peeling roller holder 42 be at the protruding position. FIG. 18 does not show the thermal head 28 and the coil spring 55, in order to make the shaft-receiving groove 25, into which the shaft 28*a* of the thermal head 28 is inserted, clearly visible.

As shown in FIG. 18, the internal frame of the printer 1 is formed with the shaft-receiving groove 25 having a substantially L-shape. Although FIG. 18 shows only a shaft-receiving groove 25 that receives one of the pair of shafts 28*a* of the thermal head 28, another shaft-receiving groove 25 that receives the other shaft 28*a* is also formed in the same manner.

As shown by the enlarged drawing in FIG. 18, the shaft-receiving groove 25 has a first groove 251 and a second groove 252. Herein, each of positions P1 and P2 shows a position where the shaft 28*a* can be in the shaft-receiving groove 25, in a virtual manner. In this disclosure, the state in which the shaft 28*a* is at the position P1 may be referred to as a state in which the thermal head 28 is at the position P1; the state in which the shaft 28*a* is at the position P2 may be referred to as a state in which the thermal head 28 is at the position P2.

The first groove 251 extends in a direction in which the thermal head 28 moves to and away from the position P1. The second groove 252 extends from the position P1 to the position P2 in a direction in which the coil spring 55 in front of the thermal head 28 biases the thermal head 28 (that is, in a rear direction). The shaft-receiving groove 25 is an L-shaped groove composed of the first groove 251 and the second groove 252, and therefore, the position of the thermal head 28 can be switched between two positions P1, P2 by this relatively simple shape. Herein, the position P2 is a position at which the thermal head 28 cannot be removed by moving it upward, while the position P1 is a position at which the thermal head 28 can be removed by moving it upward.

The thermal head 28 is movable between the positions P1 and P2 in the direction of being biased by the coil spring 55. Thus, in mounting the thermal head 28, the thermal head 28 can be easily set to the position P2 due to the biasing force of the coil spring 55, simply by inserting the shaft 28*a* to the position P1 along the first groove 251.

Next, a method of replacing the thermal head 28 will be described with reference to FIG. 19.

Figure 19:
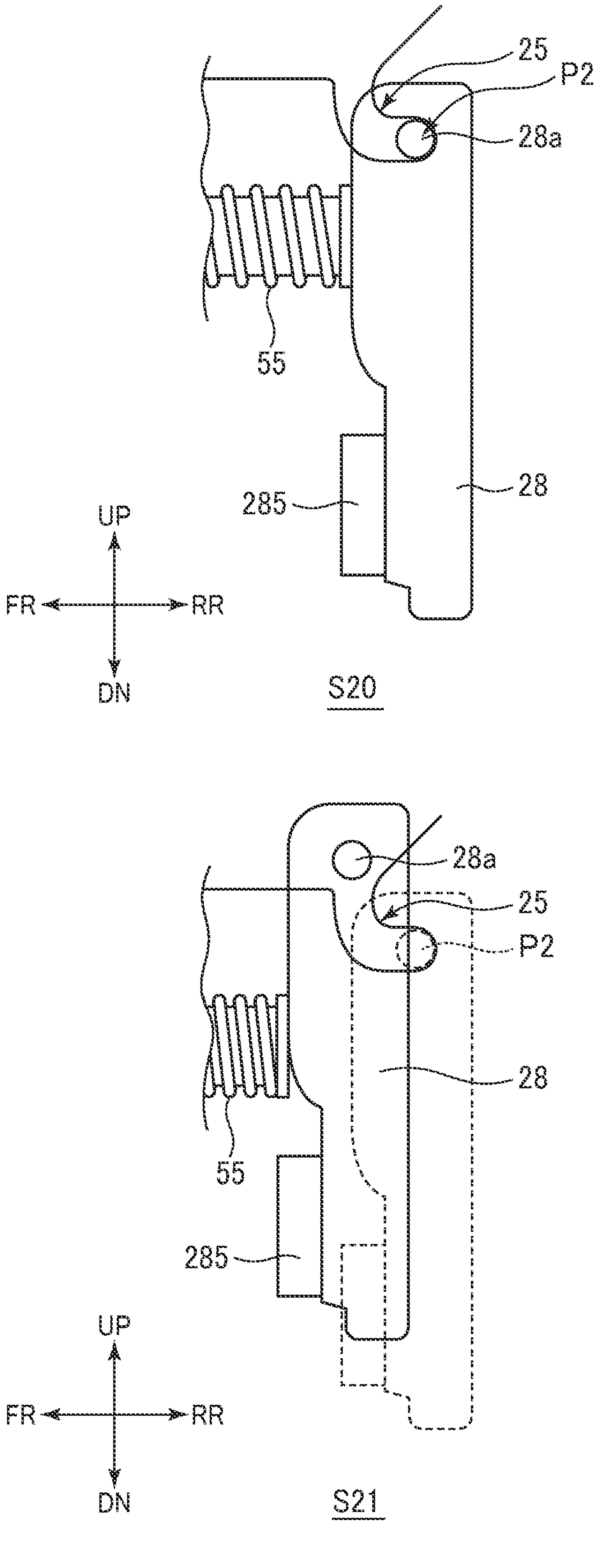
FIG. 19 illustrates a method of replacing the thermal head.

FIG. 19 illustrates a method of replacing the thermal head 28 and shows partial side views of a replacement-target thermal head 28 in states S20 and S21.

Normally, the replacement-target thermal head 28, which is mounted to the printer 1, is disposed at the position P2 of the shaft-receiving groove 25, as shown by the state S20. In this state, the whole thermal head 28 is biased to the platen roller 10 (not shown in FIG. 19) (that is, in the rear direction) by the biasing force of the coil spring 55, and the shaft 28*a* of the thermal head 28 is thereby stably positioned at the position P2.

In order to remove the replacement-target thermal head 28, it is moved from the position P2 to the position P1 in a direction opposite to a first direction, against the biasing force of the coil spring 55, as shown by the state S21. The first direction is a direction in which the coil spring 55 biases the thermal head 28, and the direction opposite to the first direction is a front direction. Subsequently, the replacement-target thermal head 28 is moved upward from the position P1, and the shaft 28*a* of the replacement-target thermal head 28 is removed from the shaft-receiving groove 25, whereby the replacement-target thermal head 28 is removed. At this time, the flexible cable 57 is connected to the connector 285 of the replacement-target thermal head 28 (refer to FIG. 21). Thus, the flexible cable 57 is disconnected from the connector 285 of the replacement-target thermal head 28.

After the replacement-target thermal head 28 is detached from the flexible cable 57, a new thermal head 28 may be mounted to the printer 1 in a procedure reverse to the procedure of taking out the thermal head 28.

Specifically, the disconnected flexible cable 57 is first connected to the connector 285 of a new thermal head 28 (refer to FIG. 16A). The new thermal head 28 is then inserted into the position P1 and is moved from the position P1 to the position P2 by the biasing force of the coil spring 55. In more detail, the new thermal head 28 is moved downward, and the shaft 28*a* of the new thermal head 28 is inserted into the shaft-receiving groove 25 from the first groove 251 (refer to FIG. 18). At this time, insertion is performed while the end of the coil spring 55 (rear end of the coil spring 55) is pressed forward (in the direction against the biasing force of the coil spring 55) by the back surface 281*b* (surface facing forward of the printer 1) of the new thermal head 28. Upon reaching the position P1, the shaft 28*a* of the new thermal head 28 is moved to the position P2 by the biasing force of the coil spring 55, without requiring an operating force of an operator. Thus, the thermal head 28 is replaced as described above.

The thermal head 28 is not disposed with the surface-mount devices, such as the connector, on the rear side (on the side disposed with the heat generating part 284), as shown in FIG. 16B, and it is thereby easy to replace. Also, in consideration of the coil spring 55 biasing the thermal head 28 rearward, if the thermal head 28 did not have a flat rear side, it would interfere with the internal frame on a rear side (e.g., a wall surface 21; refer to FIG. 20) and would be difficult to smoothly insert into the shaft-receiving groove 25. In contrast, due to the thermal head 28 having a flat rear side, the new thermal head 28 can be smoothly inserted into the shaft-receiving groove 25, although biased by the coil spring 55.

Mounting and removing of the thermal head 28 are performed when the peeling unit 4 is at the open position. In more detail, the peeling unit 4 at the closed position covers at least a part of the thermal head 28, whereas the peeling unit 4 at the open position does not cover the thermal head 28, as shown in FIG. 2. In view of this, mounting and removing of the thermal head 28 are performed when the peeling unit 4 is at the open position.

When the peeling unit 4 is at the closed position, none of other member is interposed between the peeling unit 4 and the thermal head 28, and the peeling unit 4 directly covers at least a part of the thermal head 28.

With reference again to FIG. 18, in the state in which the peeling roller cover 41 is at the open position (that is, the peeling unit 4 is at the open position), space for allowing mounting and removing the thermal head 28 having the shaft 28*a* at the position P1, is formed. Thus, an operator can remove the thermal head 28 from the printer 1 in accordance with merely the following operation process: opening the printer cover 3; continuously pressing down the peeling unit open button 52*b* to make the peeling unit 4 be in the state shown in FIG. 18; as described above, sliding the shaft 28*a* of the thermal head 28 from the position P2 to the position P1 against the biasing force of the coil spring 55; and pulling up the thermal head 28.

In addition, in the printer 1 of this embodiment, at least a part of the rear side of the thermal head 28 is exposed to the paper roll-containing chamber 9, as shown in FIG. 2. With this structure, working space for taking out the thermal head 28 is ensured by temporarily removing the paper roll "R," which enables more easily taking out the thermal head 28. Specifically, in sliding the shaft 28*a* of the thermal head 28 from the position P2 to the position P1, an operator needs to apply an operating force to the thermal head 28 from a rear side to a front side, but the operating force is easily applied due to the space behind the thermal head 28. Moreover, in pulling up the thermal head 28, the space behind the thermal head 28 helps an operator in putting a hand therein and pulling up.

In mounting the thermal head 28 to the printer 1, an operation is performed in the order reverse to the operation in taking out the thermal head 28 from the printer 1. As in the case described above, the peeling unit 4 is set to the state shown in FIG. 18. Then, the shaft 28*a* of the thermal head 28 is inserted into the position P1 from the first groove 251 of the shaft-receiving groove 25 while the end of the coil spring 55 (rear end of the coil spring 55) is pressed forward (in the direction against the biasing force of the coil spring 55) by the back surface 281*b* (surface facing forward of the printer 1) of the thermal head 28. The thermal head 28 is then moved to the position P2 by the biasing force of the coil spring 55.

Thus, the thermal head 28 can be easily replaced without using tools.

In another embodiment, the shaft-receiving groove may have another shape, instead of the L-shape. The shaft-receiving groove may have, for example, a groove extending obliquely forward or extending obliquely rearward from the position P1, as long as the thermal head 28 can be attached and removed from the position P1. Alternatively, the shaft-receiving groove may have a U-shaped groove path between the positions P1 and P2 in such a manner that the position P2 is provided at a position that the path reaches after starting from the position P1 in FIG. 18, extending forward, extending slightly downward, and then extending rearward, although this structure causes mounting and removing the thermal head 28 to be a little difficult. In this case, an operator can remove the shaft 28*a* of the thermal head 28 by moving it from the position P2 to the position P1 along the U-shaped groove.

Support Structure of Thermal Head 28

Next, a support structure of the thermal head 28 will be described with reference to FIGS. 20, 21A, and 21B.

First, a structure of the internal frame on a rear side of the thermal head 28 will be described with reference to FIG. 20. FIG. 20 is a perspective view of a part of the internal frame along with components attached to the internal frame, a part of which is enlarged. FIG. 20 does not show the thermal head 28.

Figure 20:
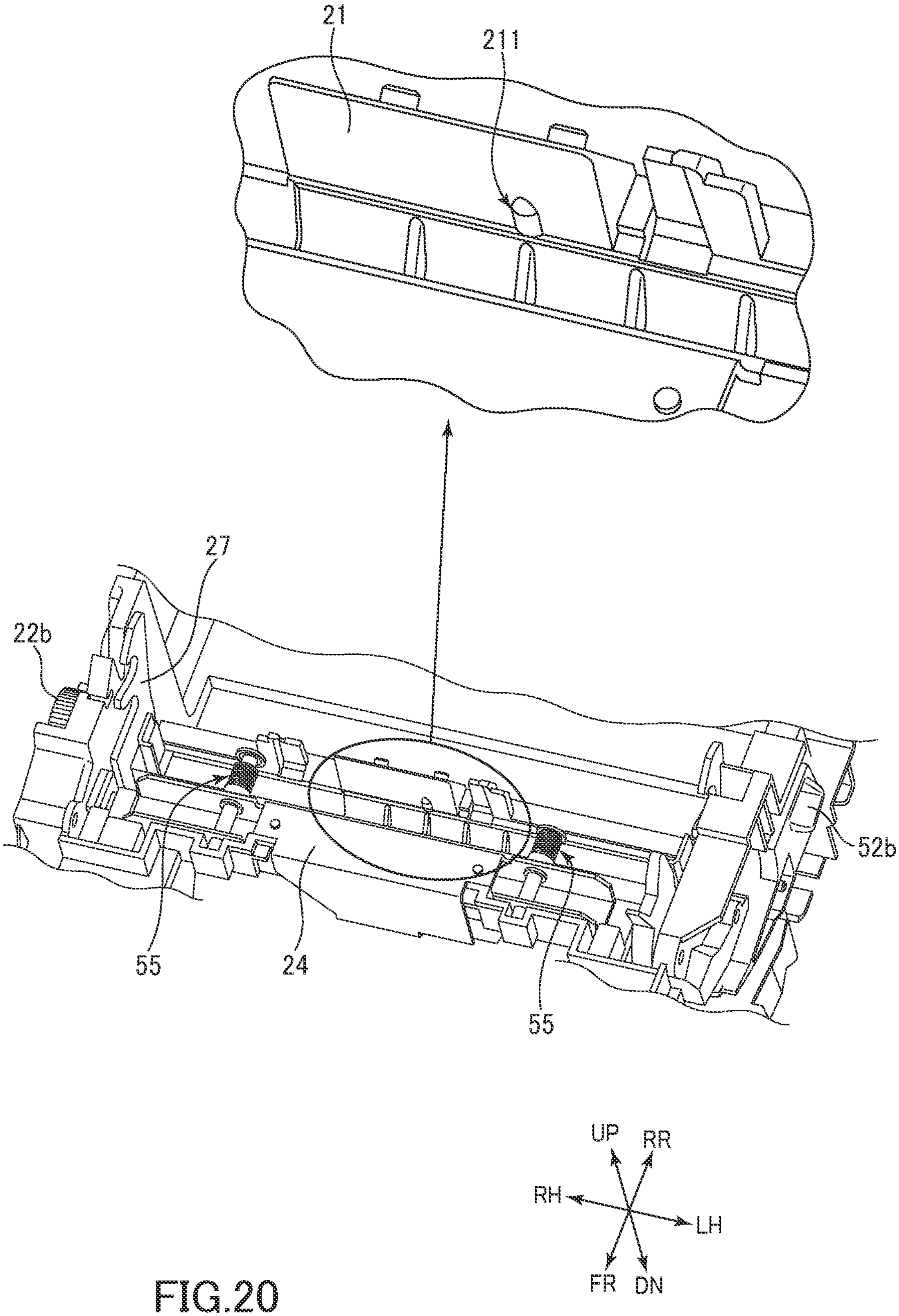
FIG. 20 shows a protrusion that is provided to an internal frame so as to support the thermal head.

As shown in FIG. 20, the internal frame has a wall surface 21 that is configured to face the rear surface of the thermal head 28, behind an area to be disposed with the thermal head 28 (on a paper roll-containing chamber 9 side). The wall surface 21 is formed with a protrusion 211. The protrusion 211 abuts on the rear surface of the thermal head 28 that is mounted. As shown in FIG. 20, the abutting surface of the protrusion 211 is preferably curved so as to be convex toward the rear surface of the thermal head 28.

Figure 21A:
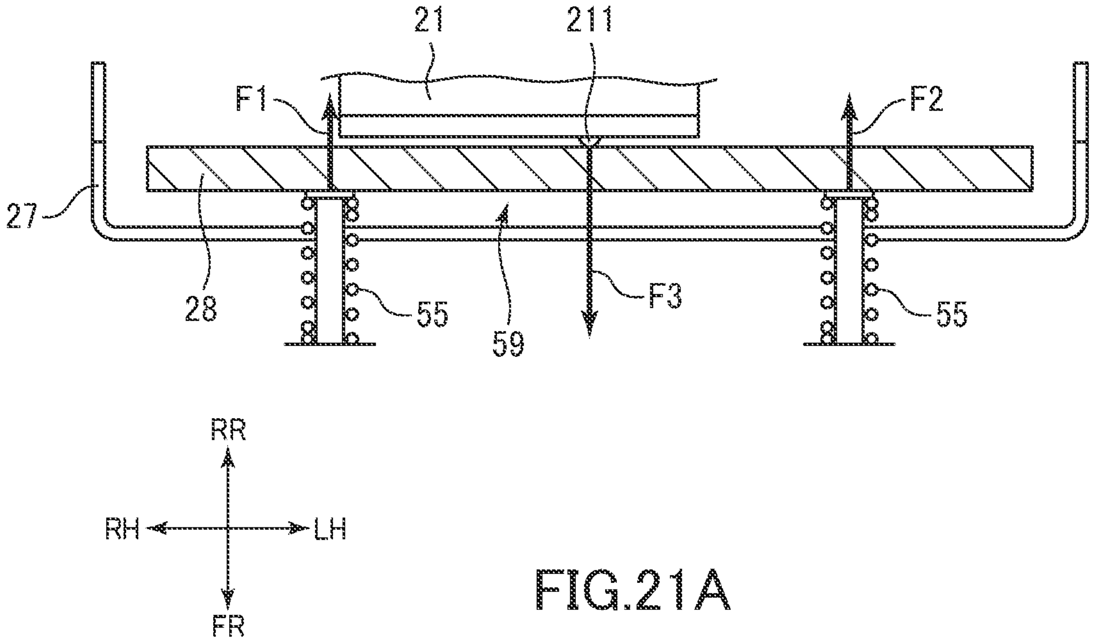
FIGS. 21A and 21B illustrate forces that act on the thermal head in the printer of the embodiment.
Figure 21B:
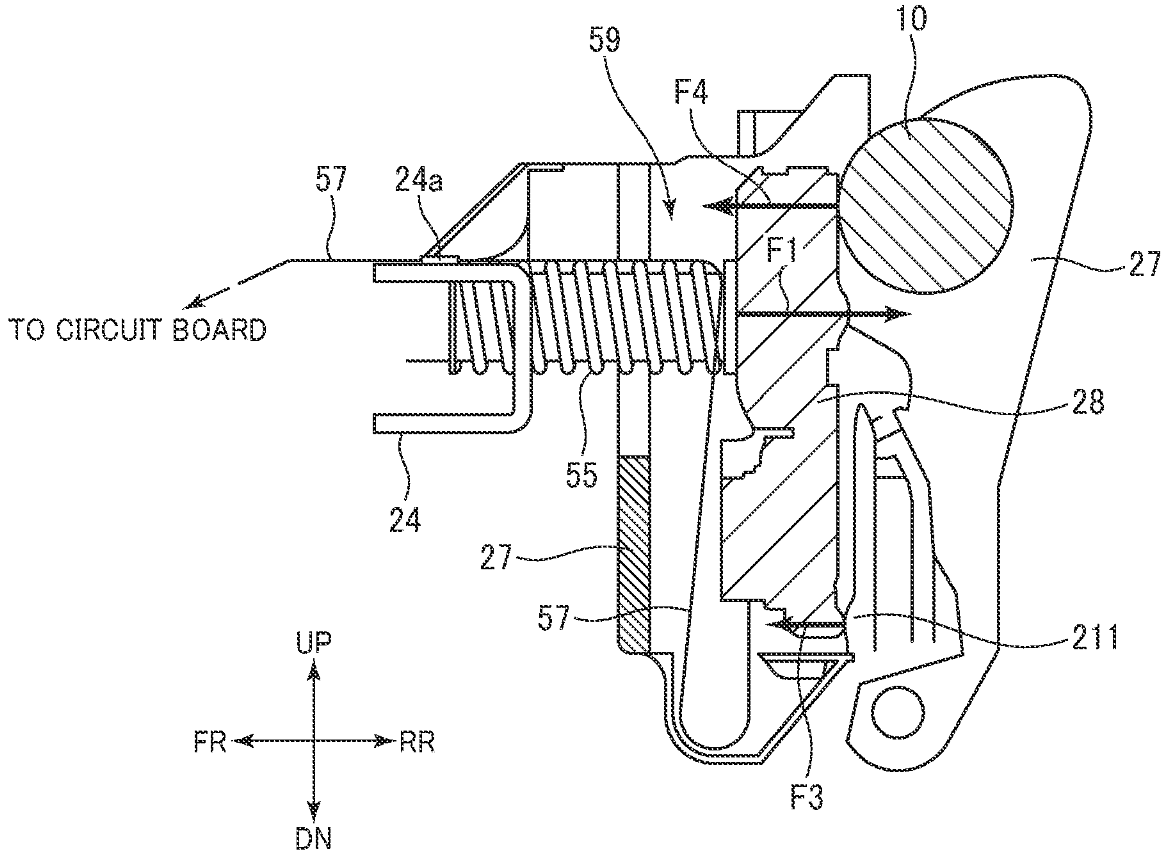

FIGS. 21A and 21B both illustrate forces that act on the thermal head 28 in the printer 1 of this embodiment; FIG. 21A shows a cross section in a plane perpendicular to the upper-lower direction, and FIG. 21B shows a cross section in a plane perpendicular to the right-left direction. FIGS. 21A and 21B have scales different from each other.

As shown in FIG. 21A, the protrusion 211 is provided at a position at which it abuts on a substantially center part in the right-left direction of the thermal head 28 that is mounted. In addition, the protrusion 211 is provided at a position at which it abuts on a substantially center position in the right-left direction between the pair of coil springs 55, of the rear side of the thermal head 28.

The cutout 283*c* (refer to FIG. 16B) is provided at the approximate center in the right-left direction of the thermal head 28, as described above, and the protrusion 211 abuts on the thermal head 28 at the cutout 283*c*. The cutout 283*c* is not covered with the board 282 and exposes the heat dissipation plate 281 of the thermal head 28, whereby the thermal head 28 is more stably supported.

It should be noted that the cutout 283*c* is not necessarily provided. The protrusion 211 may support the thermal head 28 at an area of the board 282, without the cutout 283*c* provided.

The rear surface of the thermal head 28 is preferably provided with a recess having a shape corresponding to the protrusion 211, at the position for abutting on the protrusion 211. This causes the thermal head 28 to hardly deviate from the position for abutting on the protrusion 211 and to be more stably supported.

In an embodiment, a recess may be provided in the wall surface 21 of the internal frame, whereas the rear surface of the thermal head 28 may be provided with a protrusion having a shape corresponding to the recess of the wall surface 21. In this case, the thermal head 28 is also able to swing, but it is stably supported.

The shape of the protrusion 211 shown in FIG. 20 is merely an example, and it can be another shape that swingably supports the thermal head 28. For example, the outer shape of the protrusion 211 may be a part of a spherical surface, instead of the shape shown in FIG. 20.

As shown in FIG. 21A, in a plane view of the printer 1, rearward restoring forces F1 and F2 of the pair of coil springs 55 act on the front side of the thermal head 28, whereas a reaction force F3 acts from the protrusion 211 abutting on the rear side of the thermal head 28. Herein, the protrusion 211 is at the approximate center position in a top view of the printer 1, and thus, the thermal head 28 is able to swing around a fulcrum at the protrusion 211, in a clockwise direction and a counterclockwise direction in FIG. 21A.

As shown in FIG. 21B, in a side view of the printer 1, the rearward restoring forces F1 and F2 (restoring force F2 is not visible in FIG. 21B) of the pair of coil springs 55 act on the front side of the thermal head 28. A reaction force F4 from the platen roller 10 acts on the rear side of the thermal head 28, above the points of application of the restoring forces F1 and F2. The reaction force F3 from the protrusion 211 acts on the rear side of the thermal head 28, under the points of application of the restoring forces F1 and F2. Thus, the thermal head 28 is able to swing around a fulcrum at the protrusion 211, in a clockwise direction and a counterclockwise direction in FIG. 21B.

In addition, in a side view of the printer 1, the points of applying the biasing forces of the coil springs 55 to the thermal head 28 are between the position at which the thermal head 28 receives the reaction force from the platen roller 10 and the position at which the protrusion 211 supports the rear side of the thermal head 28. With this structure, the biasing forces of the coil springs 55 are received at an upper part and a lower part, whereby the thermal head 28 is supported with good balance.

In FIG. 21B, the surface on which the protrusion 211 abuts (that is, the surface on which the heat dissipation plate 281 is exposed by the cutout 283*c*), and the surface corresponding to the heat generating part 284, are preferably in the same reference plane on the rear side of the thermal head 28. This enables pressing the heating elements of the thermal head 28 against the platen roller 10 at an appropriate angle.

As shown in FIGS. 21A and 21B, the thermal head 28 is able to swing around a fulcrum at the protrusion 211 in a clockwise swinging direction and a counterclockwise swinging direction in a side view of the printer 1. The thermal head 28 is also able to swing around a fulcrum at the protrusion 211 in a clockwise swinging direction and a counterclockwise swinging direction in a plane view of the printer 1. Thus, the thermal head 28 uniformly applies pressure to the platen roller 10 in printing. The reason of this is as follows.

In a printer having an existing thermal head, the thermal head is fixed, for example, at two points, by using screws, shafts, brackets, or the like, so as to be mounted to an internal frame or a housing of the printer. In such a case, due to deviation of the mounted position, the pressure of the thermal head abutting on a platen roller may not be uniform in an axial direction of the platen roller, which may cause degradation in print quality.

On the other hand, in this embodiment, the thermal head 28 is able to swing around a fulcrum at the protrusion 211 in a side view and in a plane view of the printer 1. With this structure, the thermal head 28 can follow and maintain uniform pressure on the platen roller 10, for example, even when there is a mounting error of the platen roller 10, circular runout of the platen roller 10 is large in rotating, or a rugged surface label is temporarily attached on a liner.

Moreover, the thermal head 28 is movable between the positions P1 and P2 (refer to FIG. 18) in the direction of being biased by the coil spring 55, and thus, the thermal head 28 is not prevented from swinging around a fulcrum at the protrusion 211.

In some printers having an existing thermal head, a fulcrum shaft is provided at a lower part of the thermal head, and this shaft is fixed to a printer body to enable the thermal head to swing in a side view. However, unlike the printer 1, this thermal head cannot be replaced without using tools. On the other hand, the printer 1 is superior to existing ones in that the thermal head 28 can be replaced without using tools while enabling to swing in a side view and in a plane view of the printer 1.

In another embodiment, protrusions 211 may be provided at two positions separated in the right-left direction on the wall surface 21 shown in FIG. 20. Also in this case, the thermal head 28 is able to swing around fulcrums at the protrusions 211 in a side view of the printer 1. Even in the case in which the thermal head 28 is able to swing only in a side view of the printer 1, degradation in print quality is prevented.

In another embodiment, protrusions 211 may be provided at two positions separated in the upper-lower direction on the wall surface 21 shown in FIG. 20. Also in this case, the thermal head 28 is able to swing around fulcrums at the protrusions 211 in a plane view of the printer 1. Even in the case in which the thermal head 28 is able to swing only in a plane view of the printer 1, degradation in print quality is prevented.

As shown in FIG. 16A, the flexible cable 57 is detachably connected to the thermal head 28. The flexible cable 57 is connected from the connector 285 of the thermal head 28 that is mounted to the printer 1, to the circuit board (not shown) at a front part of the printer 1, as shown in FIG. 21B. The flexible cable 57 is fixed at a fixing position 24*a* on an upper surface of a bracket 24 in front of the thermal head 28, for example, by screwing or adhesive.

A cable-containing chamber 59 for containing the flexible cable 57 is formed between the thermal head 28 and the circuit board. The cable-containing chamber 59 is configured to contain the relatively long flexible cable 57 between the connector of the thermal head 28 and the fixing position 24*a*. With this structure, when removed, the thermal head 28 can be moved to a position sufficiently higher than the printer 1 based on the fixed position 24*a*. This makes it easy to remove the flexible cable 57 from the connector of the thermal head 28 and to replace with a new thermal head 28.

However, the cable-containing chamber 59 is not necessarily formed. Even in this case, although the cable length from the connector 285 of the thermal head 28 to the fixing position 24*a* is reduced, it is possible to remove the flexible cable 57 from the connector 285 and to replace the thermal head 28.

As shown in FIGS. 21A and 21B, the cable-containing chamber 59 is formed in space between the platen-holding bracket 27 and the thermal head 28. Thus, the space that is formed by the platen-holding bracket 27 having a U-shape in a plane view is efficiently used.

The cable-containing chamber 59 may not be formed as the space between the platen-holding bracket 27 and the thermal head 28. In one example, the flexible cable 57 extending from the connector of the thermal head 28 may be passed under the platen-holding bracket 27, and a containing chamber may be provided on a front side of the platen-holding bracket 27.

As described above, in the printer 1, the surface-mount devices are not mounted on the rear surface of the thermal head 28 and are thereby protected from water, etc., which may enter from the ejection part 20.

In the printer 1, space for allowing mounting and removing the thermal head 28 is formed when the peeling unit 4 is at the open position not covering the thermal head 28, which improves the workability in replacing the thermal head 28. Moreover, the thermal head 28 is biased rearward (in a direction to the platen roller 10) and is movable along this direction between the first position for allowing mounting and removing the thermal head 28 and the second position for restricting mounting and removing of the thermal head 28. Thus, the thermal head 28 can be removed only by moving it from the second position to the first position, and tools and the like are not necessary.

In the printer 1, the thermal head 28 is able to swing around a fulcrum at the protrusion 211 in a clockwise swinging direction and a counterclockwise swinging direction in a side view of the printer 1, and the thermal head 28 is also able to swing around a fulcrum at the protrusion 211 in a clockwise swinging direction and a counterclockwise swinging direction in a plane view of the printer 1. Thus, the thermal head 28 uniformly applies pressure to the platen roller 10 in printing, and it is possible to prevent degradation in print quality due to the method of mounting the thermal head.

Another Embodiment of Thermal Head

Figure 22A:
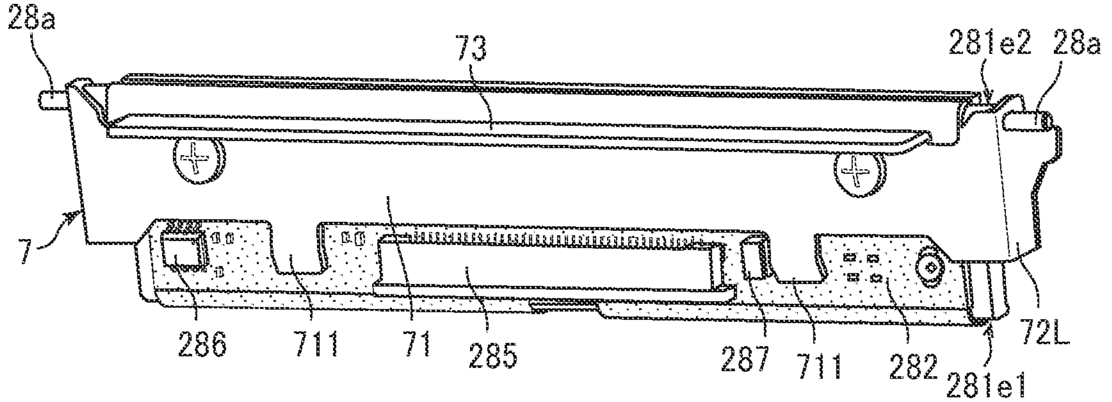
FIG. 22A is a perspective front view of a thermal head of another embodiment.
Figure 22B:
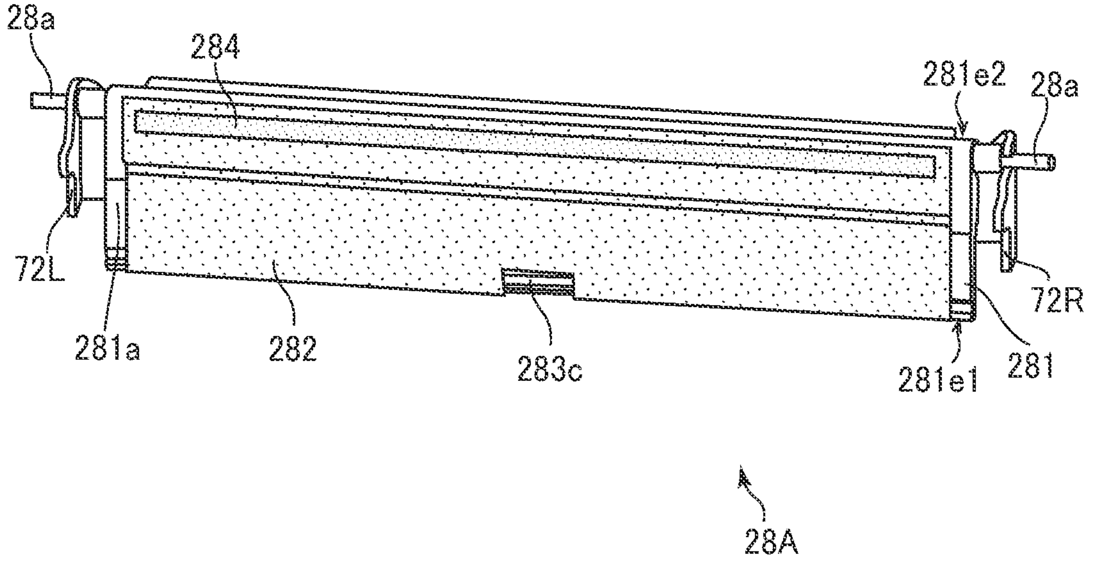
FIG. 22B is a perspective rear view of the thermal head of the another embodiment.
Figure 23:
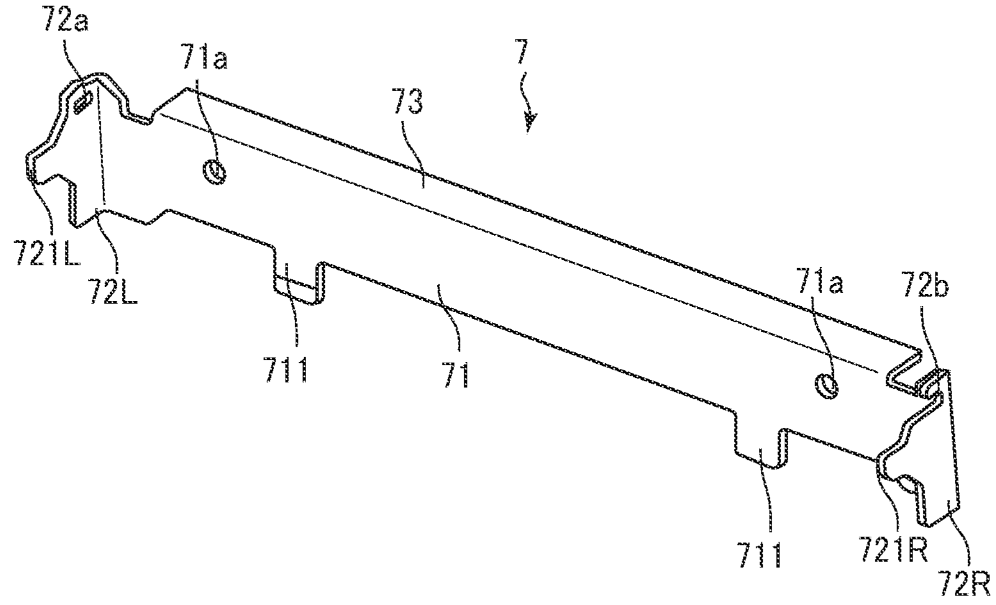
FIG. 23 is a perspective view of a plate member included in the thermal head of the another embodiment.
Figure 24:
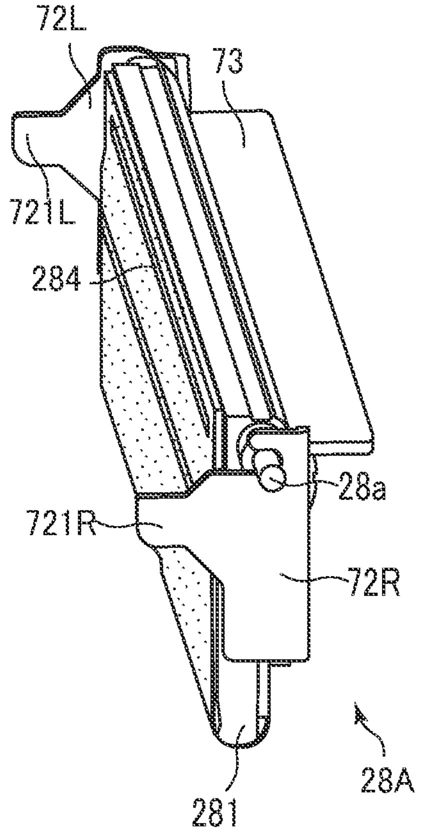
FIG. 24 is a perspective view of the thermal head of the another embodiment, as seen from a viewpoint different from that of FIG. 22.

Next, a thermal head 28A according to another embodiment will be described with reference to FIGS. 22A to 25. FIG. 22A is a perspective front view of the thermal head 28A, and FIG. 22B is a perspective rear view of the thermal head 28A. FIG. 23 is a perspective view of a plate member included in the thermal head 28A. FIG. 24 is a perspective view of the thermal head 28A, as seen from a viewpoint different from those of FIGS. 22A and 22B.

It is clear from a comparison between FIGS. 22A and 22B and FIGS. 16A and 16B that the thermal head 28A differs from the thermal head 28 in having a plate member 7.

The plate member 7, which is a member formed of a metal material such as stainless steel, is fastened to the heat dissipation plate 281 with screws. As shown in FIG. 23, the plate member 7 has a base 71, projecting pieces 72L and 72R, and a projecting plate 73.

The projecting pieces 72L and 72R project from both ends of the base 71 in a direction perpendicular to a main surface of the base 71 (that is, in a direction perpendicular to the surface 281*a* when they are attached to the heat dissipation plate 281). In the state in which the plate member 7 is attached to the heat dissipation plate 281, the projecting pieces 72L and 72R project on a side mounted with the heat generating part 284, as shown in FIG. 24. The projecting pieces 72L and 72R have edge parts 721L and 721R at ends.

The projecting piece 72L is formed with a hole 72*a*, whereas the projecting piece 72R is formed with a U-shaped groove 72*b*. As shown in FIGS. 22A and 22B, one of the pair of shafts 28*a* is inserted in the hole 72*a*, and the other shaft 28*a* is inserted in the U-shaped groove 72*b*. One of the edge parts 721L and 721R is formed with a hole, and the other is formed with a U-shaped groove. This facilitates attaching the plate member 7 to the heat dissipation plate 281.

In the state in which the plate member 7 is attached to the heat dissipation plate 281, the projecting plate 73 projects on a side mounted with the relatively tall surface-mount devices (e.g., the connector 285, the EEPROM 286, and the diode 287), as shown in FIG. 22A.

The projecting plate 73 is provided between the projecting pieces 72L and 72R over the longitudinal direction of the base 71 and projects from the base 71 in a direction opposite to the projecting pieces 72L and 72R.

The base 71 is formed with two holes 71*a* for allowing screws to pass in mounting the plate member 7 to the heat dissipation plate 281. The base 71 has two projections 711. As shown in FIG. 22A, the projections 711 are disposed so as to not interfere with the surface-mount devices when the plate member 7 is attached to the heat dissipation plate 281.

Figure 25:
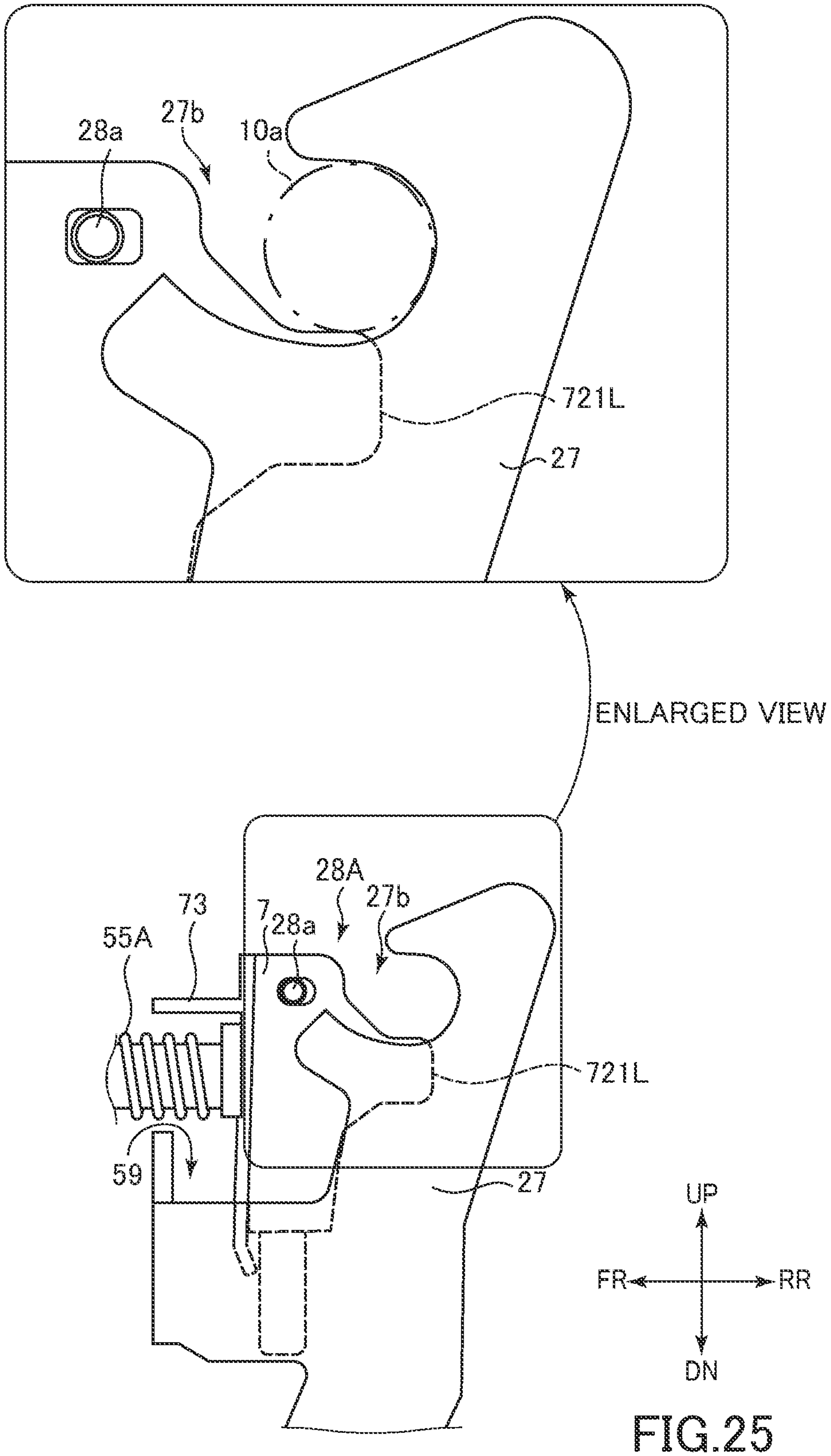
FIG. 25 is a side view showing a positional relationship between the platen-holding bracket and the thermal head of the another embodiment.

Hereinafter, effects of the thermal head 28A having the plate member 7 will be described with reference to FIG. 25. FIG. 25 is a side view showing a positional relationship between the thermal head 28A and the platen-holding bracket 27.

As described above, when the printer cover 3 is at the closed position, the platen shaft 10*a* of the platen roller 10, which is attached to the printer cover 3, is fitted in the groove 27*b* of the platen-holding bracket 27, whereby the printer cover 3 is held. In a case of the thermal head 28 that does not have the plate member 7, when an operator presses the printer cover 3 from above, for closing the printer cover 3 for example, the platen roller 10 may deviate downward from a designed position at which the platen roller 10 and the thermal head 28 abut on each other. This causes variations in density of printing. Further, the thermal head 28 is fitted to the shaft-receiving groove 25 (refer to FIG. 18), which is provided in the internal frame. The one end of the shaft 27*a* of the platen-holding bracket 27 is inserted in the boss 52*a* of the peeling unit open lever 52, whereas the other end of the shaft 27*a* is inserted in the boss provided to the internal frame (refer to FIG. 5). Thus, the position at which the platen roller 10 and the thermal head 28 abut on each other is susceptible to accumulated errors in assembling components and tends to deviate from the designed position.

The drawback of the thermal head 28 noted above is overcome by the thermal head 28A.

As shown by an enlarged drawing in FIG. 25, in the case in which the thermal head 28A is mounted to the printer 1, instead of the thermal head 28, upper ends of the edge parts 721L and 721R of the plate member 7 of the thermal head 28A are disposed at positions higher than rims that form the grooves 27*b* of the platen-holding bracket 27. Thus, the platen shaft 10*a* that is fitted in the platen-holding bracket 27 is in contact with the edge parts 721L and 721R in the grooves 27*b*. This makes it difficult for the platen roller 10 to deviate downward from the designed position at which the platen roller 10 and the thermal head 28 abut on each other, even when an operator presses the printer cover 3 from above. This is because the plate member 7 is integrally coupled to the heat dissipation plate 281 mounted with the heat generating part 284, whereby a relative positional relationship between the platen roller 10 and the heat generating part 284 is unlikely to be affected even when the platen shaft 10*a* presses down the edge parts 721L and 721R.

With reference again to FIG. 25, in the state in which the thermal head 28A is mounted to the printer 1, the projecting plate 73 of the plate member 7 projects toward the front side of the printer 1. Thus, an upper part of the cable-containing chamber 59, which is formed in front of the thermal head 28A, is covered with the projecting plate 73. This structure prevents dust from entering the printer 1 from the outside, resulting in preventing dust from adhering to upper surface portions of the surface-mount devices disposed on the front side of the thermal head 28A. That is, the projecting plate 73 functions as a hood. In particular, as shown in FIG. 2, replacement of the paper roll "R" is performed while the printer cover 3 is maintained at the open position, and dust tends to enter the printer 1. However, in this situation, it is also possible to protect the surface-mount devices of the thermal head 28A from dust.

From another point of view, providing the projecting plate 73 improves strength of the plate member 7.

Although some embodiments of the printer of the present invention are described above, the present invention should not be limited to the foregoing embodiments. In addition, the embodiments described above can be variously modified and altered within the scope not departing from the gist of the present invention. For example, respective technical features described in the foregoing embodiments can be combined with one another as appropriate, unless technical contradiction occurs.

For example, the structures and the mounting and removing methods of the thermal heads 28 and 28A are not technically related to the structure of the peeling unit 4 and the method of switching the issue modes, and therefore, they may be employed in a printer without the peeling unit 4. Conversely, the structure of the peeling unit 4 and the method of switching the issue modes may be employed in a printer that uses a structure and an mounting and removing method of a thermal head different from those of the thermal heads 28 and 28A.

A case in which some parts (e.g., shafts and ends of springs) of components inside the printer 1 are coupled to the internal frame is described here; but the structure is not limited thereto, and these parts may be coupled to the body case 2.

Although a case of using a print medium that is a continuous paper having a plurality of labels temporarily attached on a liner is described in the foregoing embodiments, the print medium is not limited thereto. For continuous issuing or for a printer not provided with a peeling unit, for example, a continuous label having an adhesive surface on one side (label without a liner), a continuous sheet without an adhesive surface (continuous sheet), or a material other than papers such as a film, which is printable by a thermal head, may also be used as a print medium. In addition, in a case of feeding a label having an exposed adhesive due to no liner, a feeding path may be coated with a non-adhesive material, and a non-adhesive roller containing silicone or the like may be provided as a platen roller.

The present invention is related to Japanese Patent Application No. 2020-191682 filed with the Japan Patent Office on Nov. 18, 2020, the entire contents of which are incorporated into this specification by reference.

The invention claimed is:

1. A thermal head comprising:

a heat dissipation plate having a first surface of a substantially rectangular shape in a plane view, and a second surface that is on an opposite side to the first surface;

a board attached to the heat dissipation plat in such a manner as to extend from the first surface to the second surface, via a first end part interposed between the first surface and the second surface;

a heating part having a plurality of heating elements, the heating part being disposed on the board over the first surface; and surface-mount devices mounted on the board over the second surface.

2. The thermal head according to claim 1, wherein the board comprises an opening part that exposes a portion of the first surface of the heat dissipation plate.

3. The thermal head according to claim 2, wherein the portion of the first surface exposed by the opening part and a surface of the heating part are in substantially the same reference plane.

4. The thermal head according to claim 3, further comprising a pair of shafts extending outward from both ends of the heat dissipation plate in a plan view.

5. The thermal head according to claim 3, further comprising a plate member attached to the heat dissipation plate, the plate member having a pair of projecting pieces that projects in a direction perpendicular to the first surface.

6. The thermal head according to claim 5, wherein the plate member comprises a projecting part extending over longitudinal direction of a second end part that is opposite to the first end part of the heat dissipation plate, the projecting part projecting in a direction perpendicular to the second surface.

7. The thermal head according to claim 2, further comprising a pair of shafts extending outward from both ends of the heat dissipation plate in a plan view.

8. The thermal head according to claim 7, further comprising a plate member attached to the heat dissipation plate, the plate member having a pair of projecting pieces that projects in a direction perpendicular to the first surface.

9. The thermal head according to claim 8, wherein the plate member comprises a projecting part extending over longitudinal direction of a second end part that is opposite to the first end part of the heat dissipation plate, the projecting part projecting in a direction perpendicular to the second surface.

10. The thermal head according to claim 2, further comprising a plate member attached to the heat dissipation plate, the plate member having a pair of projecting pieces that projects in a direction perpendicular to the first surface.

11. The thermal head according to claim 10, wherein the plate member comprises a projecting part extending over longitudinal direction of a second end part that is opposite to the first end part of the heat dissipation plate, the projecting part projecting in a direction perpendicular to the second surface.

12. The thermal head according to claim 1, further comprising a pair of shafts extending outward from both ends of the heat dissipation plate in a plan view.

13. The thermal head according to claim 12, further comprising a plate member attached to the heat dissipation plate, the plate member having a pair of projecting pieces that projects in a direction perpendicular to the first surface.

14. The thermal head according to claim 1, wherein the surface-mount devices include a memory chip and a connector for receiving a signal from the outside.

15. The thermal head according to claim 1, further comprising a plate member attached to the heat dissipation plate, the plate member having a pair of projecting pieces that projects in a direction perpendicular to the first surface.

16. The thermal head according to claim 15, wherein the plate member comprises a projecting part extending over longitudinal direction of a second end part that is opposite to the first end part of the heat dissipation plate, the projecting part projecting in a direction perpendicular to the second surface.

17. The thermal head according to claim 13, wherein the plate member comprises a projecting part extending over longitudinal direction of a second end part that is opposite to the first end part of the heat dissipation plate, the projecting part projecting in a direction perpendicular to the second surface.

* * * * *